US010928972B2

(12) United States Patent
Viegers et al.

(10) Patent No.: US 10,928,972 B2
(45) Date of Patent: Feb. 23, 2021

(54) HIERARCHICAL, ZOOMABLE PRESENTATIONS OF MEDIA SETS

(71) Applicant: Microsoft Technology Licensing, LLC, Redmond, WA (US)

(72) Inventors: Sander Martijn Viegers, Seattle, WA (US); Daniel Rosenstein, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 73 days.

(21) Appl. No.: 15/926,942

(22) Filed: Mar. 20, 2018

(65) Prior Publication Data
US 2018/0210614 A1    Jul. 26, 2018

Related U.S. Application Data

(63) Continuation of application No. 13/163,353, filed on Jun. 17, 2011, now Pat. No. 9,946,429.

(51) Int. Cl.
*G06F 3/0481* (2013.01)
*G06F 16/438* (2019.01)

(52) U.S. Cl.
CPC ........ *G06F 3/0481* (2013.01); *G06F 16/4393* (2019.01); *G06F 2203/04806* (2013.01)

(58) Field of Classification Search
CPC ............... G06F 3/0481; G06F 16/4393; G06F 2203/04806
See application file for complete search history.

(56) References Cited

U.S. PATENT DOCUMENTS 5,796,401 A    8/1998    Winer
5,987,469 A    11/1999    Lewis et al.
(Continued)

FOREIGN PATENT DOCUMENTS

CN    101088087 A    12/2007
CN    101827210 A    9/2010
(Continued)

OTHER PUBLICATIONS

"Office Action Issued in Korean Patent Application No. 1020137033365", dated May 14, 2018, 12 Pages.
(Continued)

*Primary Examiner* — Ryan Barrett
(74) *Attorney, Agent, or Firm* — Watson Patents, PLC; Vladan M. Vasiljevic

(57) ABSTRACT

Media sets may be presented as a media presentation (e.g., a slideshow or a thumbnail set), but many such presentations exhaust the attention of a user, particularly for large media sets. Instead, ratings may be identified that represents the relevance or interest of respective media objects of the media set to the user. These ratings may be identified explicitly by the user or automatically detected (e.g., by assessing image quality or monitoring user interactions with respective media objects). A zoomable media presentation of the media set may first present only media objects having a high rating, and upon zooming in near a media object, may insert, near the zoomed media object, one or more media objects associated with the zoomed media object and having a lower rating. This presentation therefore hierarchically organizes the media set, and utilizes zoom operations as a "drill-down" metaphor within the hierarchy of the media set.

19 Claims, 13 Drawing Sheets

(56) References Cited

U.S. PATENT DOCUMENTS

| | | | |
|---|---|---|---|
| 6,426,761 B1* | 7/2002 | Kanevsky | G06F 3/0481 |
| | | | 715/764 |
| 6,438,579 B1* | 8/2002 | Hosken | G06Q 30/02 |
| | | | 709/203 |
| 6,947,922 B1* | 9/2005 | Glance | G06Q 30/02 |
| | | | 705/26.1 |
| 6,950,993 B2 | 9/2005 | Breinberg | |
| 7,340,676 B2 | 3/2008 | Geigel et al. | |
| 7,536,654 B2 | 5/2009 | Anthony et al. | |
| 8,352,465 B1 | 1/2013 | Jing et al. | |
| 9,164,979 B1* | 10/2015 | Dubey | H04H 60/33 |
| 9,946,429 B2 | 4/2018 | Viegers et al. | |
| 2002/0101418 A1 | 8/2002 | Vernier et al. | |
| 2003/0067489 A1 | 4/2003 | Candy Wong et al. | |
| 2003/0147465 A1 | 8/2003 | Wu et al. | |
| 2005/0228819 A1 | 10/2005 | Richards et al. | |
| 2005/0240661 A1 | 10/2005 | Heller et al. | |
| 2006/0095864 A1* | 5/2006 | Mock | G06F 1/3203 |
| | | | 715/810 |
| 2006/0156228 A1* | 7/2006 | Gallo | G06F 3/04842 |
| | | | 715/202 |
| 2006/0224993 A1 | 10/2006 | Wong et al. | |
| 2006/0242178 A1 | 10/2006 | Butterfield et al. | |
| 2006/0271887 A1* | 11/2006 | Bier | G06F 16/9577 |
| | | | 715/866 |
| 2007/0074110 A1 | 3/2007 | Miksovsky et al. | |
| 2007/0180392 A1* | 8/2007 | Russo | G06F 3/0482 |
| | | | 715/765 |
| 2007/0240072 A1* | 10/2007 | Cunningham | G06F 3/04817 |
| | | | 715/764 |
| 2007/0271297 A1 | 11/2007 | Jaffe et al. | |
| 2007/0300158 A1 | 12/2007 | Kasperkiewicz et al. | |
| 2008/0077867 A1* | 3/2008 | Hake | H04N 7/17318 |
| | | | 715/730 |
| 2008/0077872 A1 | 3/2008 | Zeevi et al. | |
| 2008/0092054 A1 | 4/2008 | Bhumkar et al. | |
| 2008/0215984 A1* | 9/2008 | Manico | G11B 27/031 |
| | | | 715/730 |
| 2008/0222558 A1* | 9/2008 | Cho | G06F 3/0485 |
| | | | 715/784 |
| 2008/0222569 A1* | 9/2008 | Champion | G06F 3/0482 |
| | | | 715/834 |
| 2008/0313533 A1 | 12/2008 | Hoyer et al. | |
| 2009/0019031 A1 | 1/2009 | Krovitz et al. | |
| 2009/0064029 A1 | 3/2009 | Corkran et al. | |
| 2009/0113307 A1 | 4/2009 | Mackenzie | |
| 2009/0133048 A1* | 5/2009 | Gibbs | G06F 16/48 |
| | | | 725/14 |
| 2009/0164894 A1 | 6/2009 | Takekawa et al. | |
| 2009/0172562 A1* | 7/2009 | Lai | G06F 3/04817 |
| | | | 715/745 |
| 2010/0017704 A1 | 1/2010 | Jaffe et al. | |
| 2010/0050080 A1 | 2/2010 | Libert et al. | |
| 2010/0149212 A1 | 6/2010 | Fukuya et al. | |
| 2010/0162179 A1 | 6/2010 | Porat | |
| 2010/0325581 A1 | 12/2010 | Finkelstein et al. | |
| 2011/0093776 A1 | 4/2011 | Watanabe | |
| 2011/0280476 A1 | 11/2011 | Berger et al. | |
| 2012/0158638 A1* | 6/2012 | Churchill | G06Q 10/00 |
| | | | 706/52 |
| 2012/0159528 A1* | 6/2012 | Toney, Jr. | H04H 60/33 |
| | | | 725/14 |
| 2012/0210218 A1 | 8/2012 | Pendergast et al. | |
| 2012/0324357 A1 | 12/2012 | Viegers et al. | |
| 2014/0136554 A1* | 5/2014 | Moradi | G06F 16/435 |
| | | | 707/754 |

FOREIGN PATENT DOCUMENTS

| | | |
|---|---|---|
| EP | 675452 A2 | 10/1995 |
| EP | 2196920 A1 | 6/2010 |
| JP | 2003281187 A | 10/2003 |
| JP | 2007516496 A | 6/2007 |
| JP | 2008042895 A | 2/2008 |
| JP | 2009152818 A | 7/2009 |
| JP | 2010140383 A | 6/2010 |
| KR | 20070060001 A | 6/2007 |
| KR | 20090109206 A | 10/2009 |

OTHER PUBLICATIONS

Sankar, et al., "Digital Heritage—Demo Video the Sri Andal Temple-History and Legend", Retrieved from https://web.archive.org/web/20090216023432/http://virtualindia.msresearch.in/DH/demo.html, Feb. 16, 2009, 2 Pages.
"Office Action Issued in European Patent Application No. 12800008.0", dated Oct. 13, 2017, 5 Pages.
"Search Report Issued in European Patent Application No. 12800008.0", dated Dec. 2, 2014, 9 Pages.
"Final Office Action Issued in U.S. Appl. No. 13/163,353", dated Dec. 5, 2013, 22 Pages.
"Final Office Action Issued in U.S. Appl. No. 13/163,353", dated Jun. 6, 2017, 28 Pages.
"Non Final Office Action Issued in U.S. Appl. No. 13/163,353", dated Apr. 23, 2013, 21 Pages.
"Non-Final Office Action Issued in U.S. Appl. No. 13/163,353", dated Nov. 22, 2016, 28 Pages.
"First Office Action and Search Report Issued in Chinese Patent Application No. 201280029721.4", dated Sep. 6, 2015, 10 Pages.
"Office Action Issued in Japanese Patent Application No. 2014-515895", dated Jul. 19, 2016, 8 Pages.
Adcock, et al., "Managing Digital Memories With the FXPAL Photo Application", In Proceedings of the eleventh ACM international conference on Multimedia, Nov. 2, 2003, 2 Pages.
"International Search Report and Written Opinion Issued in PCT Application No. PCT/US2012/041800", dated Dec. 18, 2012, 9 Pages.

* cited by examiner

HIERARCHICAL, ZOOMABLE PRESENTATIONS OF MEDIA SETS

CROSS-REFERENCE TO RELATED APPLICATIONS

This application is a continuation of, and claims priority under 35 U.S.C. §§ 119-120 to, U.S. patent application Ser. No. 13/163,353, entitled "Hierarchical, Zoomable Presentations of Media Sets," filed on Jun. 17, 2011, the entirety of which is hereby incorporated by reference as if fully rewritten herein.

BACKGROUND

Within the field of computing, many scenarios involve the presentation of a media set, comprising a set of media objects, such as still images, videos, audio recordings, documents, or multimedia objects, or a hybrid of these types of media objects. Respective media objects may have been generated by the user to whom the media set is presented (e.g., a photo set comprising photos taken by the user), may have been generated by other users and collected by the user into the media set (e.g., photos posted by the user's friends within a social network), and/or may have been acquired by the user from a media library (e.g., purchased from a media store).

The presentation of the media objects may take many forms. The user may also generate a presentation, such as a collage of collected images physically arranged by the user in a desired manner, or a slideshow comprising a sequence of images and in an order selected by the user. Alternatively, a device storing or accessing the images may automatically generate and present various views of the media objects, such as a timed sequence comprising a slideshow, or as a set of preview versions of respective media objects, such as downsized "thumbnail" versions of images, portions of audio recordings, or leading excerpts of documents.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Many types of presentations of a media set may be problematic. As a first example, if the number of media objects in the media set is large, an automated presentation of the media objects as a sequential slideshow may take an unacceptable amount of time, and a presentation as a set of thumbnail images may be tedious to browse. Moreover, a large number of media objects in the media set may be uninteresting or redundant; e.g., a user of a digital camera may capture hundreds or thousands of images during a vacation, but many of the images may be of poor quality (such as underexposed, overexposed, out-of-focus, and blocked images), and many others may be duplicate images of the same subject in the same setting. Thus, it may be undesirable to present all of the images to the user.

A user may generate a media presentation of the media objects (e.g., by selecting significant images and creating a collage or photo album), thereby improving the selectivity, quality, and narrative context of the media presentation. However, many techniques for assisting the user in creating the media presentation may be time-consuming; e.g., the user may have to specify explicitly the media objects to be included in the presentation and the order of the media objects, as well as the order, size, and position of the media objects within a layout. These techniques may therefore present an inefficient and labor-intensive way for the user to create the media set.

Presented herein are techniques for generating a media presentation of a media set. In accordance with these techniques, various media objects may be assigned a rating, such as between one and ten, to indicate the significance of the media object within the media set. These ratings may be generated by the user (e.g., a user selection of a rating for respective media objects, or by simple user interaction with the media set, such as assigning higher ratings to media objects that the user chooses to view, spends more time viewing, or shares with friends). Alternatively or additionally, the ratings of media objects may be automatically generated (e.g., an image evaluation may be applied to an image set to identify the visual quality of each image, such as the sharpness, focus, and centering of subjects, and higher ratings may be assigned to images having higher visual quality).

A zoomable media presentation may then be generated, wherein, at an initial state, a low zoom level is selected, and the media objects having a high rating within the media set are presented within the zoomable media presentation. When a request is received to zoom into the media presentation near a particular media object, other media objects that are related to the zoomed-in media object (e.g., for a collection of images, other images captured on the same day, captured at the same location, or depicting the same subjects), but having a lower rating than the zoomed-in media object, may be selected and inserted into the zoomable media presentation near the zoomed-in media object. Moreover, respective media objects may be scaled not only according to the zoom level within the zoomable media presentation, but also according to the rating of the media objects. For example, a media presentation of an image set may first present a low zoom level, comprising only the images having the highest ratings within the media set. When a user selects to zoom in on a particular image, the zoom state of the zoomable media presentation may transition to a higher zoom level near the image, and images that are associated with the particular image and having medium-level ratings may be inserted within the media presentation near the selected image. Further zooming-in on any of these images may result in the insertion (near the selected image) of additional images from the image set that are associated with the zoomed-in image and that have a low rating. Conversely, zooming out may result in the scaling-down, and possibly the removal from the zoomable media presentation, of images having lower ratings among the currently presented images.

In this manner, the media presentation may initially present the media objects of the media set having the highest rating, and the zoom level and position may be construed as a request to "drill down" into the media set to present more media objects (with lower ratings) that are related to the zoomed-in media object. Moreover, the hierarchical presentation of the media objects may be achieved with reduced or even no involvement of the user; e.g., the user does not have to specify a layout and order of the media objects within the media presentation, but may simply interact with the media set, and the user's interactions may be monitored and interpreted as indicating the relative significance of the media objects in the media set.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
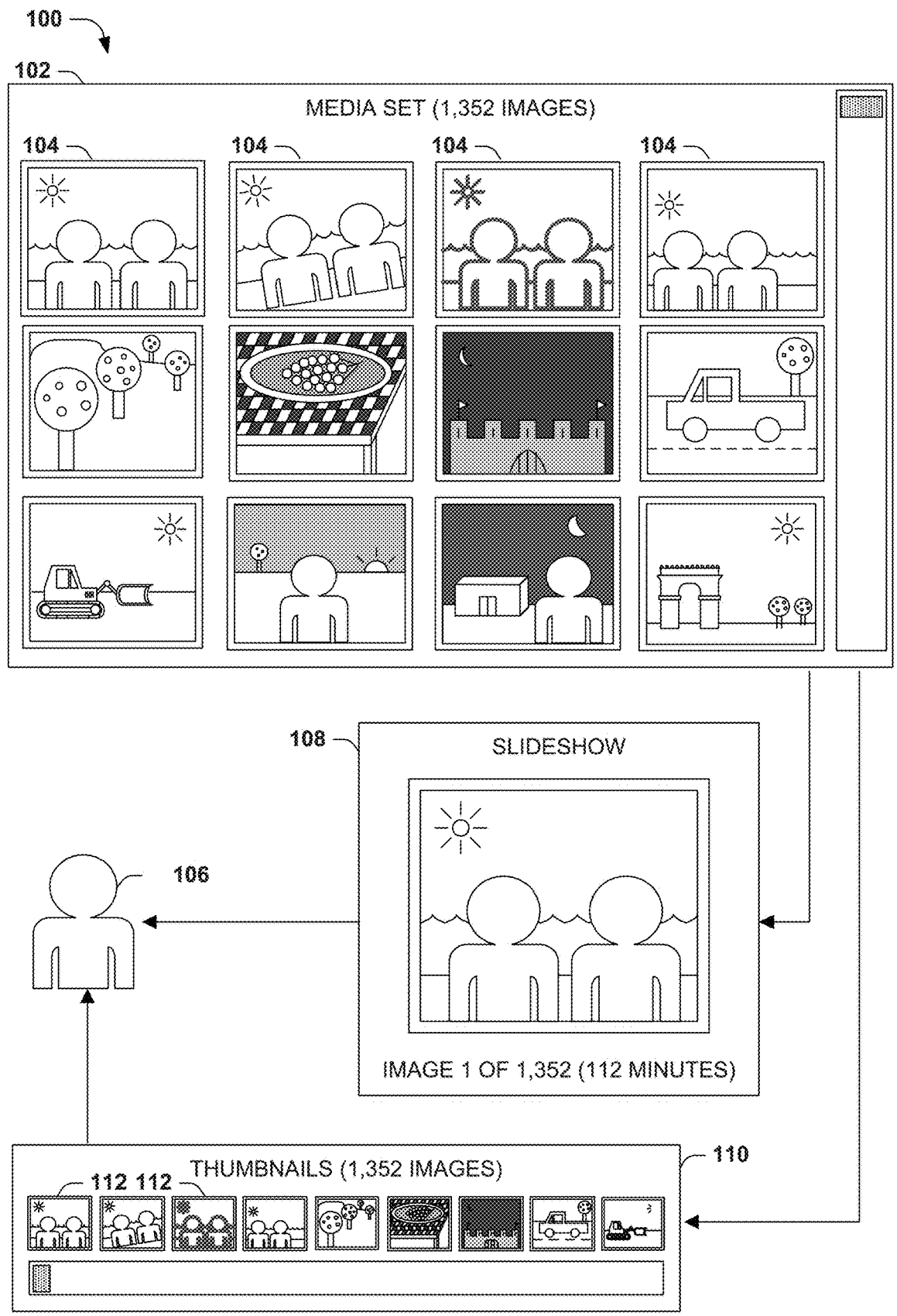
FIG. 1 is an illustration of an exemplary scenario featuring a media set presented to a user as a slideshow or a thumbnail set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve a media set comprising one or more media objects that may be presented to a user. The media set may comprise, e.g., images such as photographs or drawings; video recordings of animations or real-world or virtual environments; audio recordings of music, speech, or environmental sounds; documents such as texts, illustrated works, newspapers, or comics; mixed-media objects, such as audiovisual recordings or documents with embedded animations; or mixed sets comprising various types of objects. These objects may have been created, e.g., by the user (e.g., photos taken on a journey); by acquaintances of a user who selected the media objects to create a collection (e.g., photos captured by other users and shared with the user through a social media network or photo sharing service); or by an independent service that has delivered the media objects to the user (e.g., a stock image database from which the user has acquired a subset of images).

Within such scenarios, a user may request to view a presentation of the media set in various ways. As a first example, the media objects of the media set may be presented in an ordered or arbitrary (e.g., randomized) sequence, such as a montage, or in a concurrent manner, such as a collage. As a second example, the media set may be organized with the input of the user, such as a user-designed album, or may be automatically generated through various criteria. As a third example, the media objects may be presented in a non-interactive manner (e.g., a static set of images) or an interactive manner (e.g., a slideshow that the user may navigate through at a desired rate and in a desired order).

FIG. 1 presents an exemplary scenario 100 featuring a media set 102 comprising various media objects 104 (illustrated here as images) that are to be presented to a user 106. Many types of media presentations may be rendered from the media set 102 for the user 106. The exemplary scenario 100 of FIG. 1 presents some examples of automatically generated media presentations, which, from the media set 102, may be automatically generated by a device (such as a workstation, a server, a tablet, a smartphone, or a camera) without the involvement of the user 106. As a first example, the media set 102 may be presented as a slideshow 108 comprising a sequence of images presented for a brief period of time. The slideshow 108 may be sorted in various ways (e.g., chronologically by file creation time, or alphabetically by filename), and the user may passively view the slideshow 108 or may choose to flip through the images at a desired rate. As a second example, the media set 102 may be presented as a thumbnail set 110, comprising a set of thumbnail versions 112 of the images of the media set 102, such as scaled-down versions that indicate the contents of the respective images when viewed at full resolution. The user 106 may be permitted to scroll through the thumbnail set 110, and to view any image at full resolution by selecting the corresponding thumbnail version 112.

While the automatically generated media presentations in the exemplary scenario 100 of FIG. 1 may enable the user 106 to review the contents of the media set 102, these exemplary automatically generated media presentations may exhibit some difficulties to the user 106, particularly with large media sets 102. For example, the media set 102 in the exemplary scenario 100 of FIG. 1 includes 1,352 images, which may be tedious or overwhelming for the user 106 to review. Moreover, only a subset of the media objects 104 in the media set 102 may be particularly interesting or relevant to the user 106. For example, the first four images in the media set 102 may depict the same scene involving two individuals standing near a body of water on a sunny day. The first image may be interesting to the user 106, and may comprise a better version of the scene than the second image (which may be tilted), a third image (which may be blurry), and a fourth image (which may not exhibit apparent flaws, but which may simply be redundant with the first image). The media set 102 may include many such inadequate or redundant media objects 104, and presenting the entire media set 102 to the user 106 may therefore be undesirable. For example, even with an image period of five seconds, the slideshow 108 of the entire media set 102 may have a duration of nearly two hours; and the thumbnail set 110 of the media set 102 may include 1,352 thumbnail versions 112, which may overwhelm the user 106.

The selectivity of such renderings of the media set 102 may be improved through the involvement of the user 106. For example, the user 106 may explicitly define a subset of media objects 104 to be included in a media presentation. A media presentation design tool may be provided to the user 106 to assist in this task, such as a media album generating utility that may permit the user 106 to select some media objects 104 from the media set 102, specify an arrangement among the subset of the media objects 104 (such as an order) and generate an album compilation of the selected media objects 104 (e.g., an audio disc or photo disc).

Figure 2:
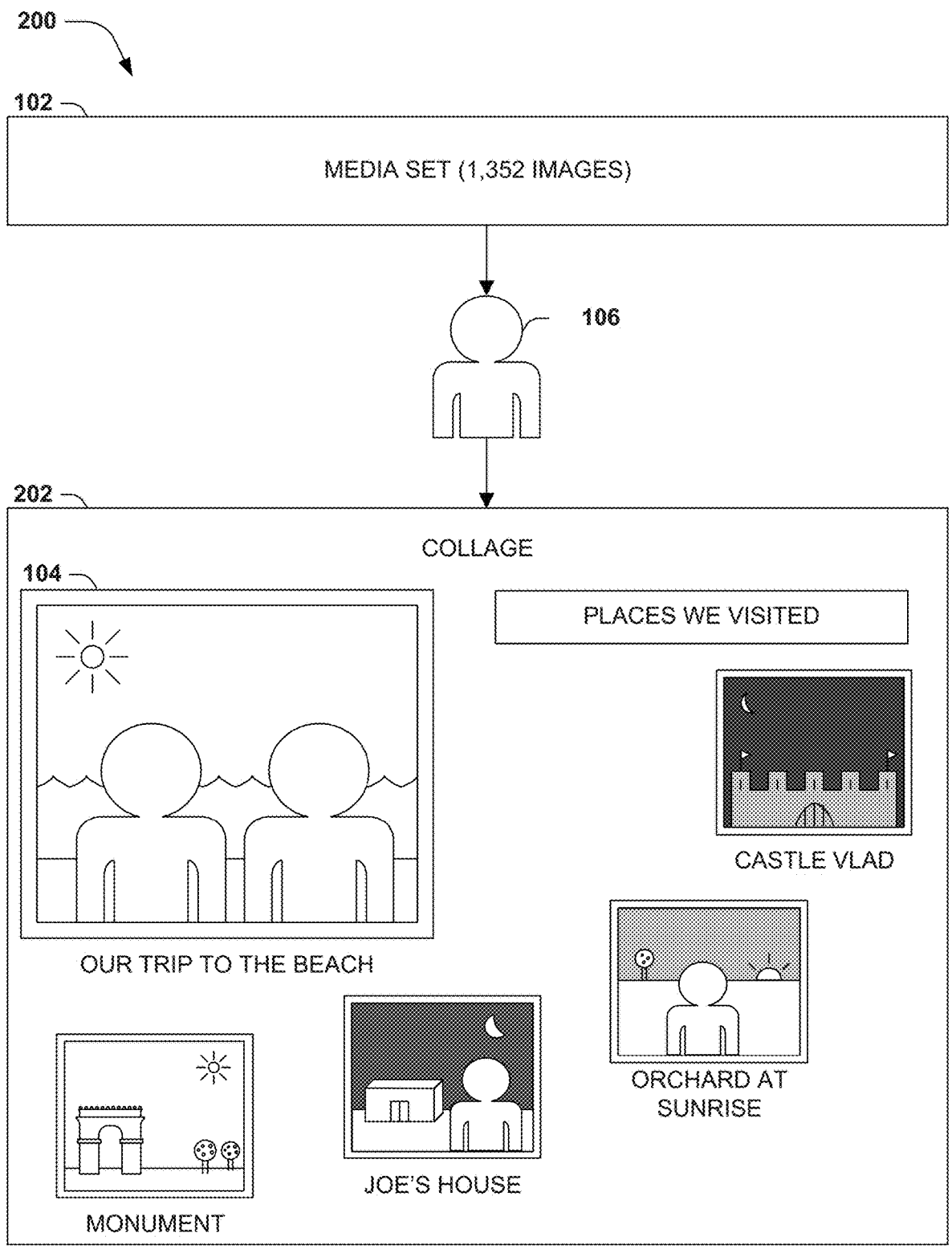
FIG. 2 is an illustration of an exemplary scenario featuring a media set designed by a user as a collage.

FIG. 2 presents an exemplary scenario 200 featuring one such user-generated presentation of the media set 102 in the form of a collage 202. For example, the user 106 may generate one or more collage pages, each comprising a selection of images that are captioned, scaled, and positioned as desired by the user 106. The collage 202 may therefore present an organization desired by the user 106, such as a summary, a thematic presentation, or a narrative, that may provide a semantic context to the selected media objects 104 and the media set 102. However, the generation of the collage 202 may involve an extensive amount of attention from the user 106, including an extensive threshing through the media set 102, e.g., to remove substandard images and to compare and select among redundant images. Particularly for large media sets 102 (e.g., an attempt to select and arrange a photo album from the 1,352 images comprising the media set 102), and the user 106 may not be interested in or capable of allocating such attention to the generation of the collage 202.

B. Presented Techniques

Presented herein are techniques to facilitate the generation of a media set 102 that may reduce the complexity and explicit attention of the user 106 in the generation of a suitable media presentation of a media set 102. In accordance with these techniques, for respective media objects 104 of the media set 102, a rating may be identified, e.g., indicating the quality, relevance, and/or interest level of the user 106 in the media object 104 in view of the other media objects 104 of the media set 102. These ratings may be explicitly identified by the user 106; may be identified based on the activities of the user 106 (e.g., the amount of time that the user 106 spends viewing each image); and/or may be automatically identified (e.g., an image quality evaluation algorithm applied to estimate the quality of respective images of the media set 102). Moreover, respective media objects 104 may be identified as having relationships with other media objects 104 of the media set 102, such as a first image captured on the same day as a subset of other images within the media set 102, or a first image depicting the same locations or subjects as a subset of other images within the media set 102. These associations may also be identified explicitly by the user 106 (e.g., explicitly grouping the images in different folders of a file system); implicitly based on the actions of the user 106 (e.g., naming or tagging each image to indicate the subjects depicted in each image, and comparing the names or tags to identify images depicting the same subjects); and/or automatically identified (e.g., using a facial recognition algorithm to identify individuals depicted in each image).

In accordance with these techniques, the media set 102 may be rendered as a zoomable media presentation, wherein the user 106 may choose to zoom into and out of the media presentation to view different levels of detail. Moreover, in addition to enabling the user 106 to view more or less detail for a particular media object 104 of the media set 102, the zoom state of the media presentation may be used as a "drill-down" metaphor for viewing more or less detail for a particular portion of the media set 102. For example, the media set 102 may initially be presented at a low zoom level, and may initially present only the media objects 104 of the media set 102 having a high rating. If the user 106 chooses a different zoom state (e.g., zooming in to a higher zoom level at a particular location within the zoomable media presentation) near a particular media object 104, the zoomable media presentation may insert, near the zoomed media object 104, one or more additional media objects 104 that are associated with the zoomed media object 104 (e.g., captured on the same day or depicting the same subjects), but that have a lower rating than the zoomed media object 104. Moreover, these media objects 104 may be scaled according to the rating of the media object 104 and the zoom level; e.g., at a particular zoom level, a media object 104 having a high rating may appear at a large size, a media object 104 having a mid-level rating may appear at a medium size, and a media object 104 having a low rating may appear at a small size (or may be hidden until the user 106 transitions to an even higher zoom state near these media objects 104). In this manner, the zoom level of the zoomable media presentation may be interpreted as a request by the user 106 to view more media objects 104 of the media set 102 associated with the zoomed media object 104. Thus, the media set 102 is presented as a hierarchy, initially showing only a small subset of media objects 104 having the highest ratings in the media set 102, but access to the other media objects 104 is readily available through the use of the familiar zoom operation as a contextual "drill-down" metaphor.

Figure 3:
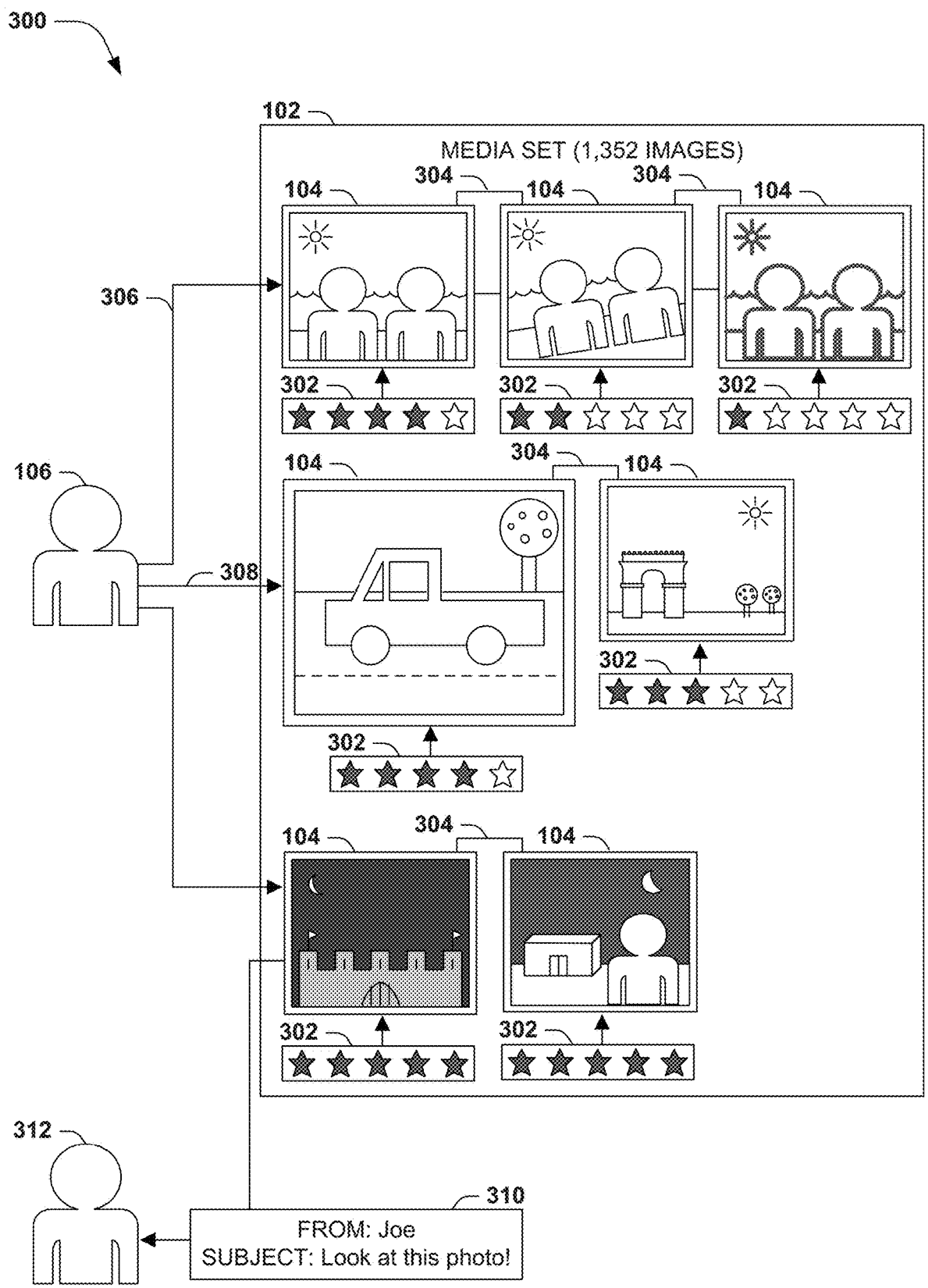
FIG. 3 is an illustration of an exemplary scenario featuring the identification by a user of ratings for respective media objects of a media set.
Figure 4:
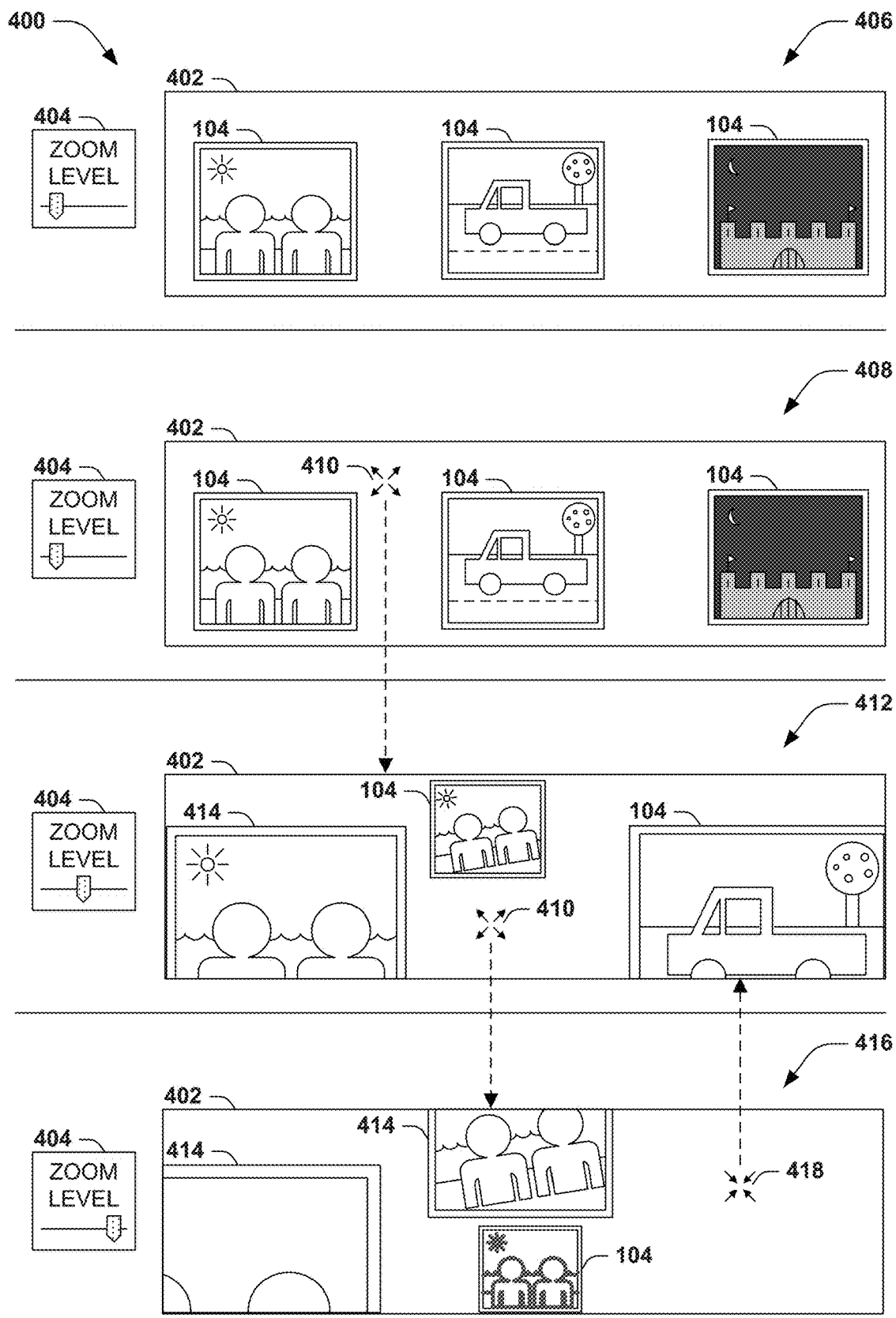
FIG. 4 is an illustration of an exemplary scenario featuring a zoomable media presentation of a media set according to the techniques presented herein.

FIGS. 3-4 together present an exemplary scenario featuring a media presentation of a media set in accordance with the techniques presented herein. In the exemplary scenario 300 of FIG. 3, a media set 102 comprising 1,352 media objects 104 is accessible to a user 106, who may wish to view a media presentation thereof. The user 106 is permitted to identify a rating 302 for respective media objects 104 on a scale of zero to five stars, wherein a five-star rating 302 indicates an image of high quality, relevance, or interest to the user 106 and a one-star rating 302 indicates an image of low quality, relevance, or interest to the user 106. The user 106 may explicitly rate some or all of these images of the media set 102. For example, among the first three images, the user 106 may assign a four-star rating 302 to a first image that is an appealing representation of a scene; may assign a two-star rating 302 to a second image that depicts the same scene but with an askew orientation; and may assign a one-star rating 302 to a third image that depicts the same scene but that is out of focus. Alternatively or additionally, the device presenting the media set 102 to the user 106 may monitor the interactions 308 of the user 106 with the media objects 104, and may infer ratings 302 based thereupon. For example, while viewing the media set 102, the user 106 may select a particular media object 104; may view a particular media object 104 for a long period; may resize a particular media object 104 (e.g., expanding a media object 104 to view it in higher detail, or reducing the size of a media object 104); and/or may share a media object 104 with another user 106 (e.g., sending a message 310 to a friend 312 attaching a media object 104). From such interactions 308, the device may infer a rating 302 for the media objects 104 (e.g., identifying a higher rating 302 for a first media object 104 that the user 106 views for a longer time than a second media object 104 having a lower rating 302, and identifying a higher rating 302 for an image that the user 106 chooses to expand while identifying a lower rating 302 for an image that the user 106 chooses to shrink or hide). Additionally, the device may identify one or more associations among media objects 104 (e.g., media objects 104 created on the same day, presenting the similar subjects, or organized together by the user 106).

In accordance with the techniques presented herein, such ratings 302 and associations may be used to generate a zoomable media presentation of the media set 102, wherein the zoom level may be adjusted to "drill down" within the media set 102 to varying levels of detail. FIG. 4 presents an exemplary scenario 400 featuring such a zoomable media presentation 402 at various states. At a first state 406 (e.g., an initial state), the zoomable media presentation 402 may be presented at a low zoom level 404, featuring only the media objects 104 of the media set 102 having a comparatively high rating 302 (e.g., the media objects 104 rated in the top 10% of the media set 102, or the media objects 104 having four or five stars). At a second state 408, a zoom-in operation 410 may be detected (e.g., provided by a user 106 or specified by an application) that requests a higher zoom level 404 at a particular location in the zoomable media presentation 402. Moreover, the location may be near a media object 104 having a high rating 302. According to the techniques presented herein, at a third state 412, the zoomable media presentation 402 may be presented at a higher zoom level 404 near the zoomed media object 414, and a second media object 104, having a medium rating 302 and associated with the zoomed media object 414, may be presented in the zoomable media presentation 402. An additional zoom operation 410 near the second media object 414 may result in the presentation of a fourth state 416 at a high zoom level 404 of the zoomable media presentation 402, wherein a third media object 104, having a low rating 302 and associated with the second media object 104, is presented near the second media object 104. A zoom-out operation 418 in this fourth state 416 may result in a reversion to the third state 416, including an optional removal of the media object 104 having a low rating 302. Additionally, respective media objects 104 may be scaled within the zoomable media presentation 402 according to the zoom level 404 and the respective ratings 302 of the media objects 104 (e.g., media objects 104 having higher rating 302 may be scaled to appear larger, and media objects 104 having a lower ratings 302 may be scaled to appear smaller). In this manner, the zoomable media presentation 402 of the media set 102 may enable the user 106 to interact with the media set 102 in a hierarchical manner using familiar "zoom" operations in accordance with the techniques presented herein.

C. Exemplary Embodiments

Figure 5:
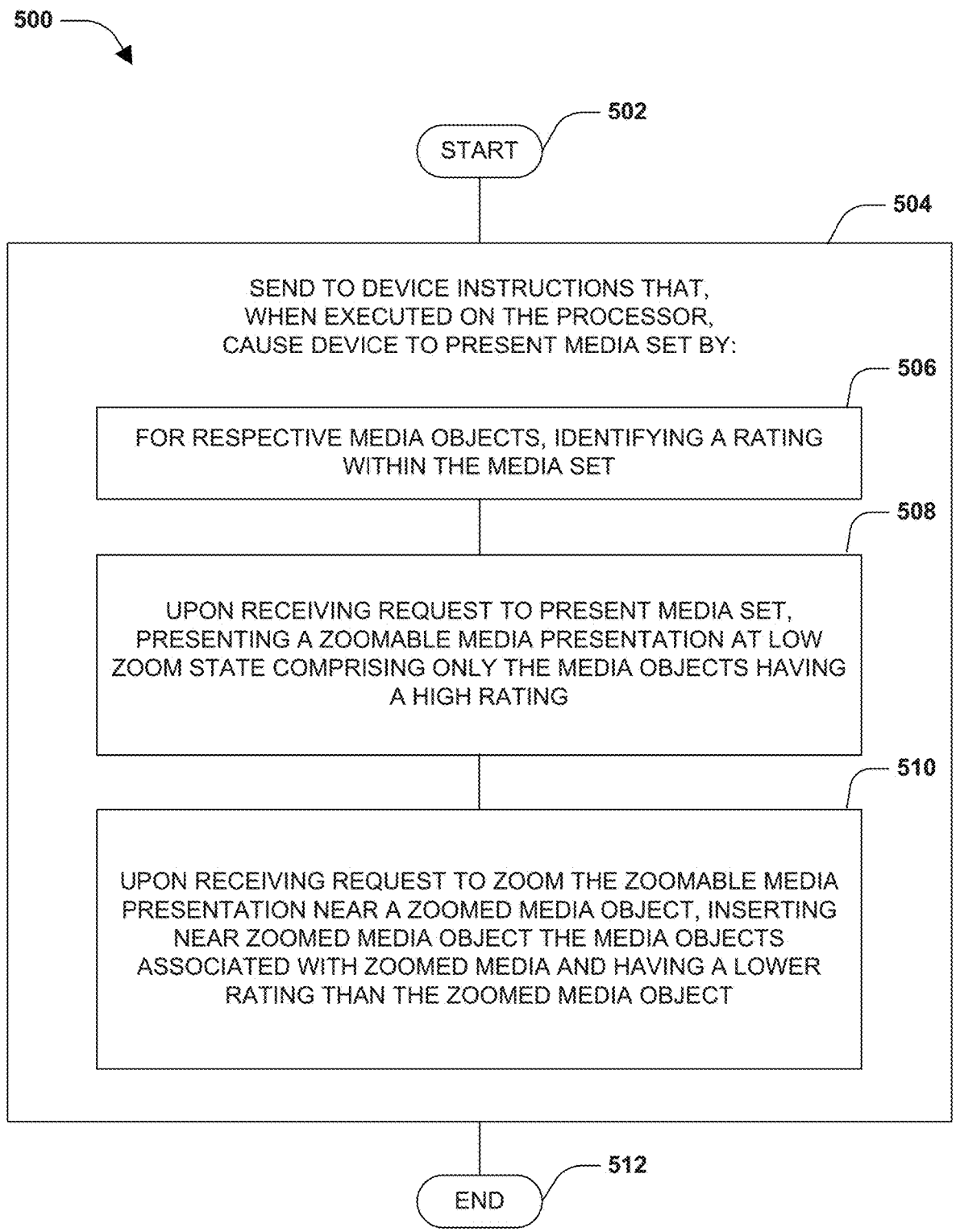
FIG. 5 is a flowchart illustrating an exemplary method of presenting a media set comprising at least one media object in accordance with the techniques presented herein.

FIG. 5 presents a first embodiment of these techniques, illustrated as an exemplary method 500 of presenting a media set 102 comprising at least one media object 104. The exemplary method 500 may comprise, e.g., a set of processor-executable instructions that, when executed on a processor of a device, cause the device to present the media set 102 according to the techniques presented herein. The exemplary method 500 begins at 502 and involves sending 504 the instructions to the device. In particular, the instructions are configured to, for respective media objects 104, identify 506 a rating 302 within the media set 102. The instructions are also configured to, upon receiving a request to present the media presentation, present 508 a zoomable media presentation 402 at a low zoom level comprising the media objects 104 having a high rating 302 (and not, at this low zoom level, including the media objects 104 of the media set 102 having a comparatively low rating 302). The instructions are also configured to, upon receiving a request to zoom the zoomable media presentation 402 near a zoomed media object 414, insert 510 near the zoomed media object 414 the media objects 104 associated with the zoomed media object 414 and having a lower rating 302 than the zoomed media object 414. In this manner, the configuration of the instructions executed on the processor causes the device to present a zoomable media presentation 402 of the media set 102 in accordance with the techniques presented herein, and so the exemplary method 500 ends at 512.

Figure 6:
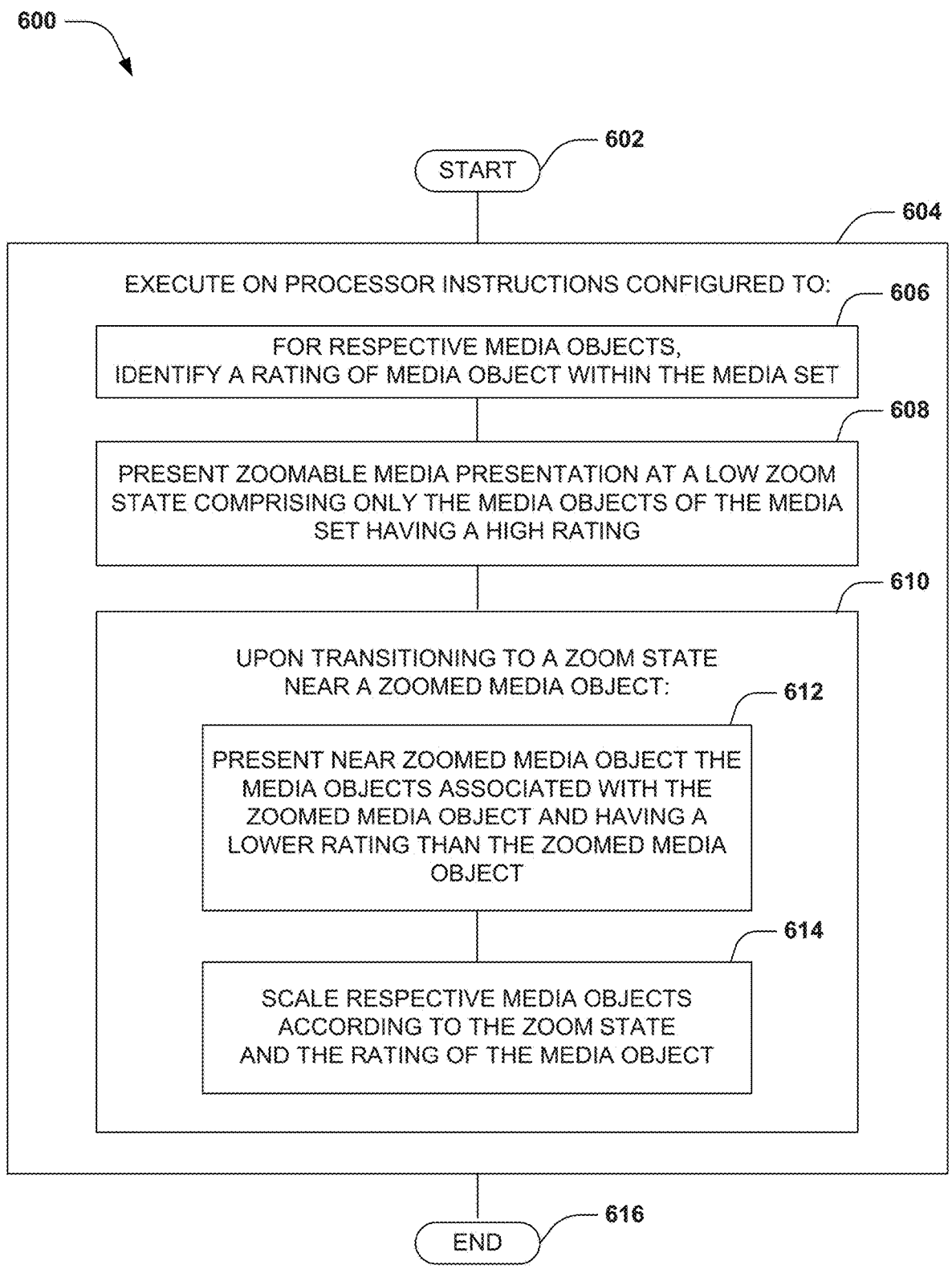
FIG. 6 is a flowchart illustrating an exemplary method of generating a media presentation of a media set comprising at least one media object in accordance with the techniques presented herein.

FIG. 6 presents a second embodiment of these techniques, illustrated as an exemplary method 600 of generating a media presentation of a media set 102 comprising at least one media object 104. The exemplary method 600 may comprise, e.g., a set of processor-executable instructions stored in a memory component (e.g., a memory circuit, a platter of a hard disk drive, a solid-state storage device, or a magnetic or optical disc) of a device having a processor that, when executed, cause the device to present the media set 102 according to the techniques presented herein. The exemplary method 600 begins at 602 and involves executing 604 the instructions on the processor of the device. In particular, the instructions are configured to, for respective media objects 104, identify 606 a rating 302 of the media object 104 within the media set 102. The instructions are also configured to present 608 a zoomable media presentation 402 at a low zoom level 404, where the zoomable media presentation 402 (at the low zoom level 404) comprises the media objects 104 of the media set 102 having a (comparatively) high rating 302 (i.e., at this low zoom level, not including the media objects 104 of the media set 102 having a comparatively low rating 302). The instructions are also configured to, upon transitioning 610 to a zoom state near a zoomed media object 414, present 612 near the zoomed media object 414 the media objects 104 associated with the zoomed media object 414 and having a lower rating 302 than the zoomed media object 414; and scale 614 respective media objects 104 according to the zoom state and the rating 302 of the media object 104. In this manner, the configuration of the instructions sent to the device, when executed on the processor, causes the device to generate a zoomable media presentation 402 of the media set 102 in accordance with the techniques presented herein, and so the exemplary method 600 ends at 616.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 7:
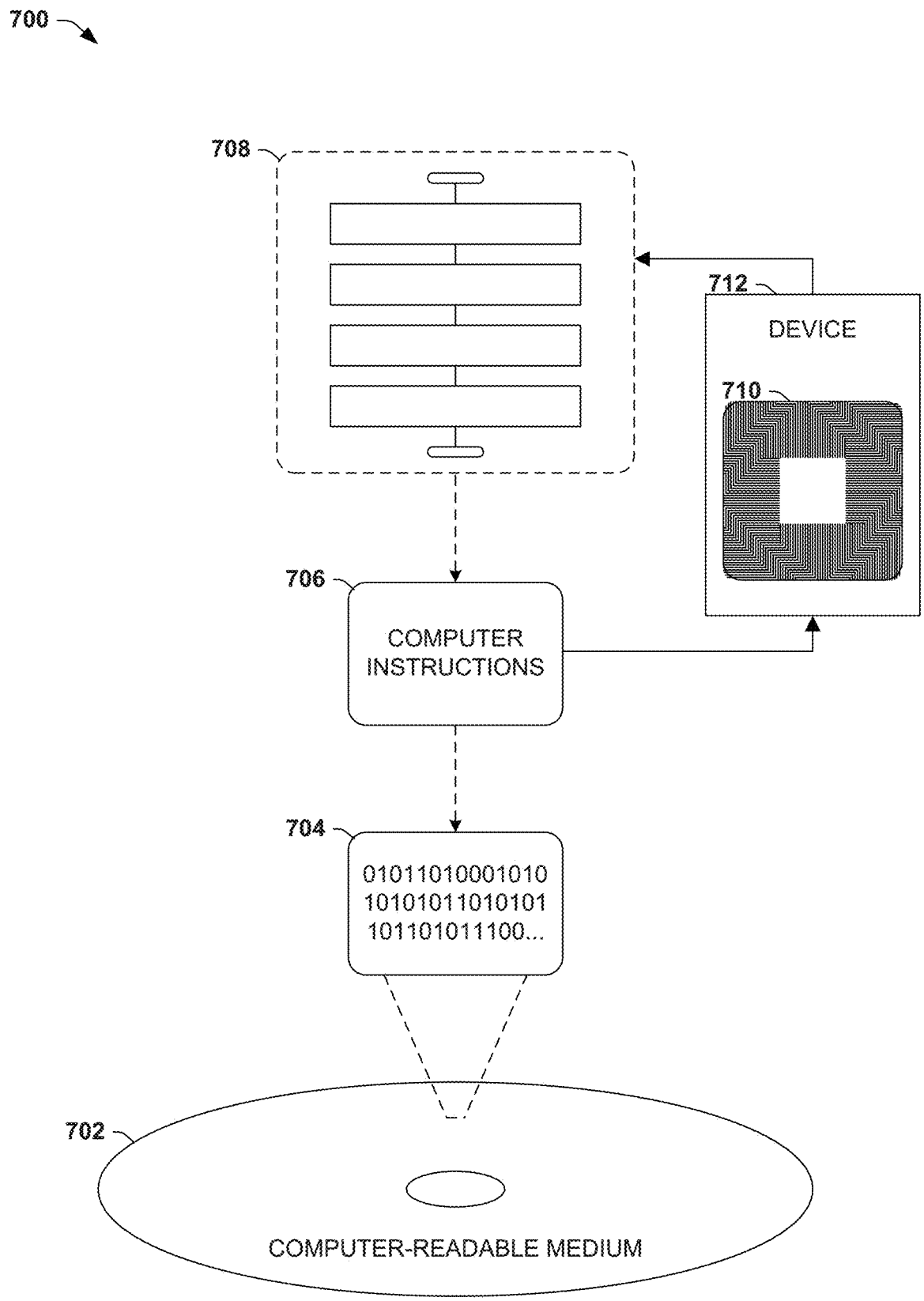
FIG. 7 is an illustration of an exemplary computer-readable medium comprising processor-executable instructions configured to embody one or more of the provisions set forth herein.

FIG. 7 presents an illustration of a third embodiment of these techniques, illustrated as an exemplary computer-readable medium 700 (e.g., a CD-R, DVD-R, or a platter of a hard disk drive) on which is encoded computer-readable data 704. This computer-readable data 704 in turn comprises a set of computer instructions 706 configured such that, when executed on a processor 710 of a device 712, cause the device to operate according to the principles set forth herein. In one such embodiment, the processor-executable instructions 706 may be configured to perform a method 708 of presenting a media set 102 comprising at least one media object 104, such as the exemplary method 500 of FIG. 5. In another such embodiment, the processor-executable instructions 706 may be configured to implement a method 708 of generating a media presentation of a media set 102 comprising at least one media object 104, such as the exemplary method 60 of FIG. 6. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 500 of FIG. 5 and the exemplary method 600 of FIG. 6) to confer individual and/or synergistic advantages upon such embodiments.

D(1). Scenarios

A first aspect that may vary among embodiments of these techniques relates to the scenarios wherein such techniques may be utilized. As a first variation of this first aspect, these techniques may be implemented on many types of devices, including a client device configured to render a presentation of a media set 102, or a server configured to present a presentation to be rendered as a presentation on another device (e.g., a webserver generating the presentation as a web page to be rendered on a web browser of a client device). Such devices may also include, e.g., workstations, servers, notebooks, tablet and/or palmtop computers, mobile phones, media players, game consoles, televisions, still and motion cameras, personal data assistants (PDAs), and global positioning system (GPS) receivers. Such devices may also receive input from the user in many ways, such as a keyboard, a pointing device such as a mouse, touch input, gestures, visual input (e.g., a motion camera configured to identify a body position of a user), and voice input, and may provide output to the user in many ways, including a display component, speakers, and a haptic device. Additionally, the device may present a media set 102 that is stored locally on the same device, on another device that is locally available (e.g., a file server provided on the same network), or on a remote server of the media set 102.

As a second variation of this first aspect, these techniques may be utilized with many types of media sets 102, such as sets of images (e.g., photographs, paintings, or drawings), video recordings (e.g., animations or captures of real or virtual environments), audio recordings (e.g., captured of real or synthesized speech, music, or environmental sounds), and/or documents (e.g., texts, illustrated works, newspapers, or comics). The media set 102 may also include one or more mixed media objects 104 (e.g., a document with an embedded video recording), and may include media objects 104 of different types. The media set 102 and/or media objects 104 may also be protected by digital rights management (DRM) technologies and/or various license restrictions, or may be unrestricted by technology and/or license.

As a third variation of this first aspect, many types of ratings 302 may be identified for respective media objects 104. For example, a spectrum or scale may be established for the media set 102, and the ratings 302 of respective media objects 104 may identify the position of the media object 104 within the spectrum or scale (e.g., a rating of 1 to 10 or of a number of stars). Alternatively, the ratings 302 may be arbitrarily identified, e.g., as an unbounded score of each media object 104, such as the number of seconds that the user 106 has spent consuming each media object 104. As still another alternative, the rating 302 of a first media object 104 may be relative to a second media object 104 of the media set 102; e.g., the media objects 104 may organized into a structure, such as a list or tree, that indicates the relative relevance or interest of each media object 104 with respect to the other media objects 104 of the media set 102, and the rating 302 may comprise an indication of the media object 104 within the structure.

As a fourth variation of this first aspect, the media set 102 may be organized in many ways. For example, the media objects 104 may be presented as an arbitrary collection, such as an unordered set; as an ordered list, such as a set of media objects 104 having sequentially numbered filenames or other identifiers; or as a hierarchy represented in many ways, such as a set of relations in a database, or locations of respective media objects 104 within a hierarchical organization, such as a tree or a hierarchically structured file system. This organization may be utilized in many aspects of these techniques (e.g., to indicate associations between and among media objects 104, such as an association of media objects 104 that are grouped together in a folder of a hierarchical file system, or to identify the ratings 302 for respective media objects 104). Alternatively or additionally, a first media set 102 may contain a media object 104 that is actually a second media set 102, such that zooming in on the media object 104 first presents the media objects 104 of the second media set 102 that have a high rating 302, and further zooming in on the media object 104 near a contained media object 104 presents other media objects 104 near the zoomed media object 414 and having a lower rating 302 than the zoomed media object 414. Those of ordinary skill in the art may devise many scenarios wherein the presently disclosed techniques may be utilized.

D(2). Identifying Media Set Ratings and Associations

A second aspect that may vary among embodiments of these techniques relates to the manner of identifying the information to enable the zoomable media presentation 402 of the media set 102, including the ratings 302 of the media objects 104 and the associations thereamong. As a first variation, the ratings 302 of respective media objects 104 of the media set 102 may be identified by a user 106, and a device 712 may be configured to receive the ratings 302 of respective media objects 104 from the user 106, store the ratings 302, and utilize the ratings 302 when generating the zoomable media presentation 402 of the media set 102. For example, as illustrated in the exemplary scenario 300 of FIG. 3, the media objects 104 of the media set 102 may be presented with a visual control that enables a user 106 to select a rating 302 of respective media objects 104. Alternatively, the ratings 302 of respective media objects 104 may be inferred, e.g., by presenting one or more media objects 104 to the user 106 and monitoring the interactions 308 of the user 106 with the media objects 104. For example, a high rating 302 may be identified for media objects 104 that the user 106 chooses to review, review for a long time, scale up (e.g., expanding a larger version of the media object 104), save, bookmark, tag as relevant, and/or share with friends 312 or other users. Conversely, a low rating 302 may be identified for media objects 104 that the user 106 chooses to disregard, review only briefly, scale down (e.g., reducing to a smaller version of the media object 104), tag as irrelevant, and/or delete from a collection. Ratings 302 may also be explicitly identified or inferred from the interactions 308 of users 106 other than the user 106 to whom the zoomable media presentation 402 is presented; e.g., within a social media network, various users 106 may identify ratings of respective media objects 104, and the collective ratings 302 of the media objects 104 may be used to generate the zoomable media presentation 402 of the media set 102. The presentation of the media set 102 to the user 106 may also change in response to the ratings 302 assigned by the user 106; e.g., media objects 104 assigned higher ratings 302 may be scaled up in the presentation to the user 106, and media objects 104 assigned lower ratings 302 may be scaled down in the presentation to the user 106.

As a second variation of this second aspect, the ratings 302 of respective media objects 104 of the media set 102 in an automated manner, e.g., without directing involving the attention of a user 106 to the media objects 104 of the media set 102, but rather based on the properties of respective media objects 104. As a first example of this second variation, a media object quality may be estimated for respective media objects 104, and ratings 302 for respective media objects 104 may be selected that are proportional with the estimated quality of the media object 104. For example, for media objects 104 comprising images, an image evaluation technique may be utilized to estimate an image quality of the image (e.g., sharpness, focus, contrast, and orientation), and a rating 302 may be identified proportional with the estimated quality of the image.

As a second example of this second variation, respective media objects 104 may relate to one or more subjects that may be significant to the user 106, and the rating 302 of a media object 104 may be selected that is proportional to the significance to the user 106 of the subjects in the subjects associated with the media object 104. For example, the user 106 may have relationships with individuals in a social network, where some relationships are close (e.g., him- or herself, family members, and close friends), other relationships are average (e.g., more distant friends), and still other relationships are distant (e.g., passing acquaintances). In a media object 104 such as an image depicting one or more individuals, biometrics may be utilized to identify the individuals depicted in the image, and the rating 302 of the image may be selected based on the interest of the user 106 in the depicted individuals.

As a third example of this second variation, an organizational structure of the media set 102, such as a hierarchy, may be utilized to identify the ratings 302 of respective media objects 104 of the media set 102. For example, the ratings 302 of respective objects 104 may be selected relative to the hierarchical position of the media object 104 within the hierarchy (e.g., for a media set 102 stored within a portion of a file system, media objects 104 closer to the root of the file system may be assigned a high rating 302, and media objects 104 positioned deep within the hierarchy may be assigned a low rating 302). Alternatively or additionally, for a particular media object group of media objects 104 (e.g., media objects 104 stored as files within the same folder of a file system hierarchy), a representative media object 104 of the media object group may be selected, and a higher rating 302 may be selected for the representative media object group than for other media objects 104 within the same media object group.

As a third variation of this second aspect, respective associations among media objects 104 (which may be used, e.g., to select media objects 104 to be inserted into a zoomable media presentation 402 near a zoomed media object 414) may be identified in various ways. For example, associations may be identified explicitly by the user 106, e.g., by specified direct associations between media objects 104, or by tags identifying shared properties of associated media objects 104. Alternatively or additionally, associations may be automatically identified based on shared data or metadata properties, such as media objects 104 created on the same date, of the same type, generated with the same device or by the same user 106, or stored in the same location of a file system. Those of ordinary skill in the art may devise many ways of identifying the ratings 302 and associations among media objects 104 of a media set 102 while implementing the techniques presented herein.

D(3). Generating the Zoomable Media Presentation

A third aspect that may vary among embodiments of these techniques relates to the generation of the zoomable media presentation 402 of the media set 102. As a first variation of this third aspect, the zoomable media presentation 402 may be arbitrarily zoomable; e.g., a user 106 may choose any zoom level focused on any location within the zoomable media presentation 402. Alternatively, the zoomable media presentation 402 may be presented as discretely zoomable; e.g., the user 106 may only view the zoomable media presentation 402 within a constrained set of zoom levels and/or locations.

As a second variation of this third aspect, different types of zooming mechanisms may be presented within the zoomable media presentation 402. As a first such example, changing the zoom level of the zoomable media presentation 402 may alter various properties of respective media objects 104 presented therein, including the size, quality, and amount of detail presented in the media object 104. For example, zooming into a media object 104 representing a document may result in a presentation of a larger depiction of the document, featuring a higher-quality rendering of the font used to depict the text of the document, and/or a presentation of more data about the document, or a lengthier excerpt of the document, possibly scaling up to a depiction of the full contents of the document.

Figure 8:
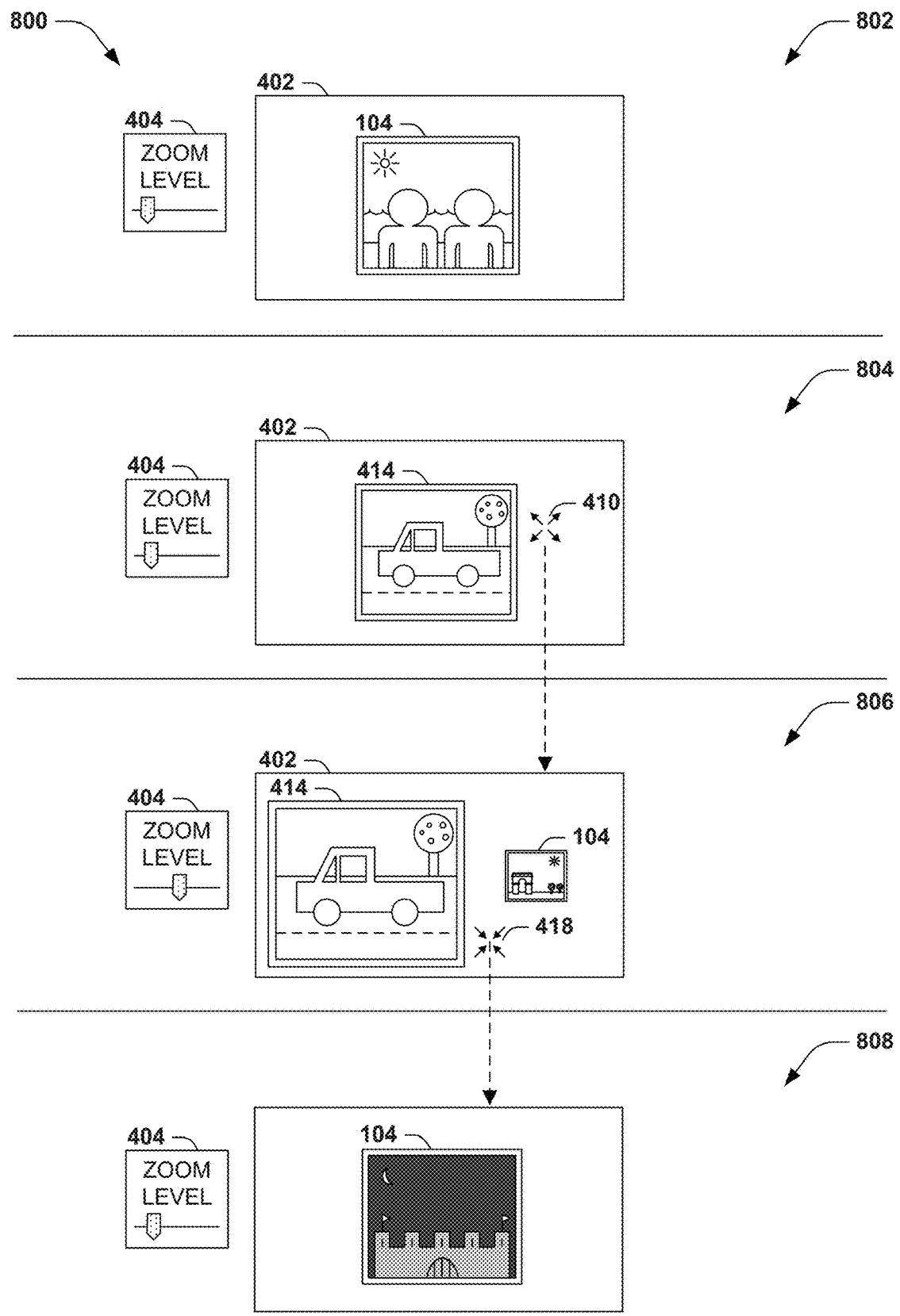
FIG. 8 is an illustration of an exemplary scenario featuring an effect of a zoom operation within a zoomable media presentation of a media set.

As a second such example, the insertion into the zoomable media presentation 402 of additional media objects 104 in response to a zoom-in operation may alter the presentation of the media set 102 in various ways. FIG. 8 presents a first exemplary scenario 800 featuring an implementation of a zoomable media presentation 402 comprising a slideshow of a media set 102. This slideshow may present, e.g., a timed sequence of media objects 104 having a high rating 302, optionally including captions and visual transitions between elements, and allowing a user 106 viewing the slideshow to pause, speed up, slow down, or reorder or edit the media objects 104 of the slideshow. However, in accordance with the techniques presented herein, the slideshow may also enable zoom operations to alter the slideshow sequence by inserting or removing additional media objects 104 related to a zoomed media object 414. For example, at a first state 802 in the exemplary scenario 800 of FIG. 8, a first media object 104 having a high rating 302 within the media set 102 may be presented for a brief duration. In the absence of user input from the user 106, the slideshow may proceed to a second state 804, wherein a second media object 104 having a high rating 302 is presented for a brief duration. If a zoom-in operation 410 is detected within the zoomable media presentation 402 during the second state 804, then a third state 806 may present the zoomable media presentation 402 depicting the zoomed media object 402 (the second media object 104 being displayed when the zoom-in operation 410 is detected) at a larger size, and inserting one or more media objects 104 that are associated with the zoomed media object 402 and that have a lower rating 302 than the zoomed media object 402. Additional zoom-in operations 410 may result in the insertion of additional media objects 104 in accordance with the techniques presented herein. Conversely, a zoom-out operation 418 received during the third state 806 (or a lack of user input for from the user 106 for a specified period of time) may result in a fourth state 808 representing a resetting of the zoom level 404 to the initial zoom level and a resumption of the slideshow presenting the next media object 104 in the sequence having a high rating 302. In this manner, the zoomable aspects of the zoomable media presentation 402 may be used to add or remove detail (in the form of the insertion or removal of additional media objects 104 having lower ratings 302) to the slideshow presentation.

Figure 9:
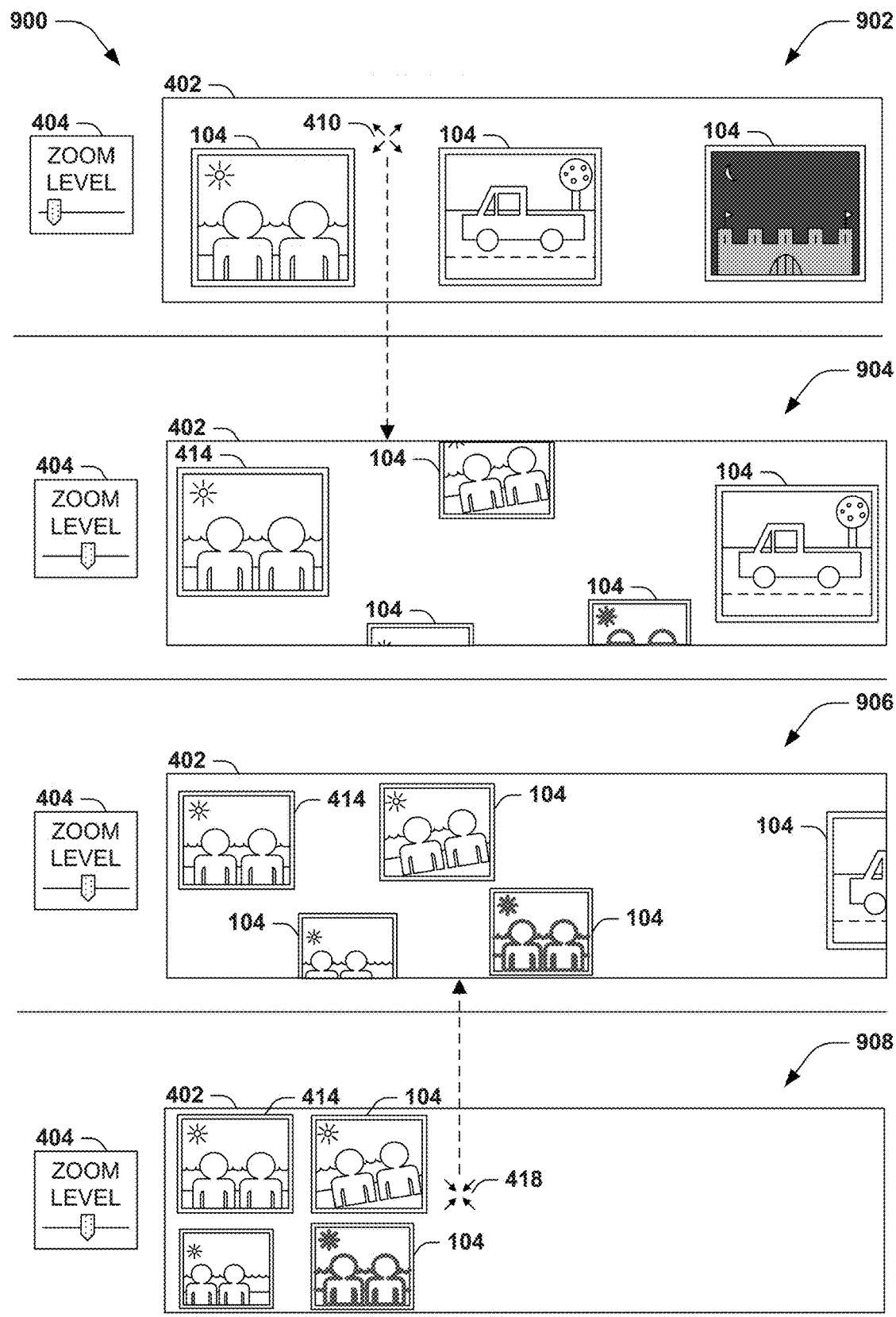
FIG. 9 is an illustration of an exemplary scenario featuring another effect of a zoom operation within a zoomable media presentation of a media set.

FIG. 9 presents a second exemplary scenario 900 featuring an implementation of a zoomable media presentation 402 of a media set 102. At a first state 902 in this first exemplary scenario 900, a set of media objects 104 of the media set 102 are presented in the zoomable media presentation 402 at a particular zoom level 404. When a zoom-in operation 410 is detected near a zoomed media object 404, the zoomable media presentation 402 begins transitioning to the zoom level 404 indicated by the zoom-in operation 401. For example, if the zoom level 404 is performed by a variable magnitude input (e.g., a mouse wheel that may be rotated quickly or slowly, or a touchpad gesture that may be performed in a large or small manner), the degree of transition may be associated with the magnitude of the input (e.g., a transition to a much higher zoom level 404 for large-magnitude input, and a transition to a slightly or moderately higher zoom level 404 for a small-magnitude input). In this first exemplary scenario 900, the transition may progress through a first transition state 904 and a second transition state 806 before reaching a target state 908 representing the desired zoom level 404. Moreover, the transition states may present various depictions, such as smooth or stop-motion animations, that indicate the transition to the target state 908. For example, at the first transition state 904, the media objects 104 that are not near the zoom-in operation 410 and that are not associated with the zoomed media object 414 may transition out of the zoomable media presentation 402 (e.g., initiating a slide, fade, or shrink), while the media objects 104 that are associated with the zoomed media object 414 and that have lower ratings 302 than the zoomed media object 414 may transition into the zoomable media presentation 402 (e.g., sliding into view from the borders of the zoomable media presentation 402). Additionally, at least one dimension of the zoomed media object 414 may be reduced to expose an exposed portion of the presentation space, and the newly inserted media objects 104 may be positioned within the exposed portion of the presentation space. These transitional animations may continue through the second transition state 906, and possibly other transition states, until the target state 908 is achieved, where a zoom-out operation 418 may result in a reversal of this transition to return to the first state 902. Thus, the zoom-in operation 410 is utilized as a "drill-down" metaphor to present more media objects 104 in the media set 102 that are associated with the zoomed media object 414. While the zoomed media object 414 is actually scaled down with respect to the first state 802 of the zoomable media presentation 402, the zoom metaphor is preserved in various ways (e.g., the zoom-in operation 414 may be invoked through familiar "zoom-in" operations, such as a multi-touch spread gesture or a mouse wheel up operation; the reversibility of the zoom operation; and the proportional scaling of a background image to reflect the zoom level 404).

Figure 10:
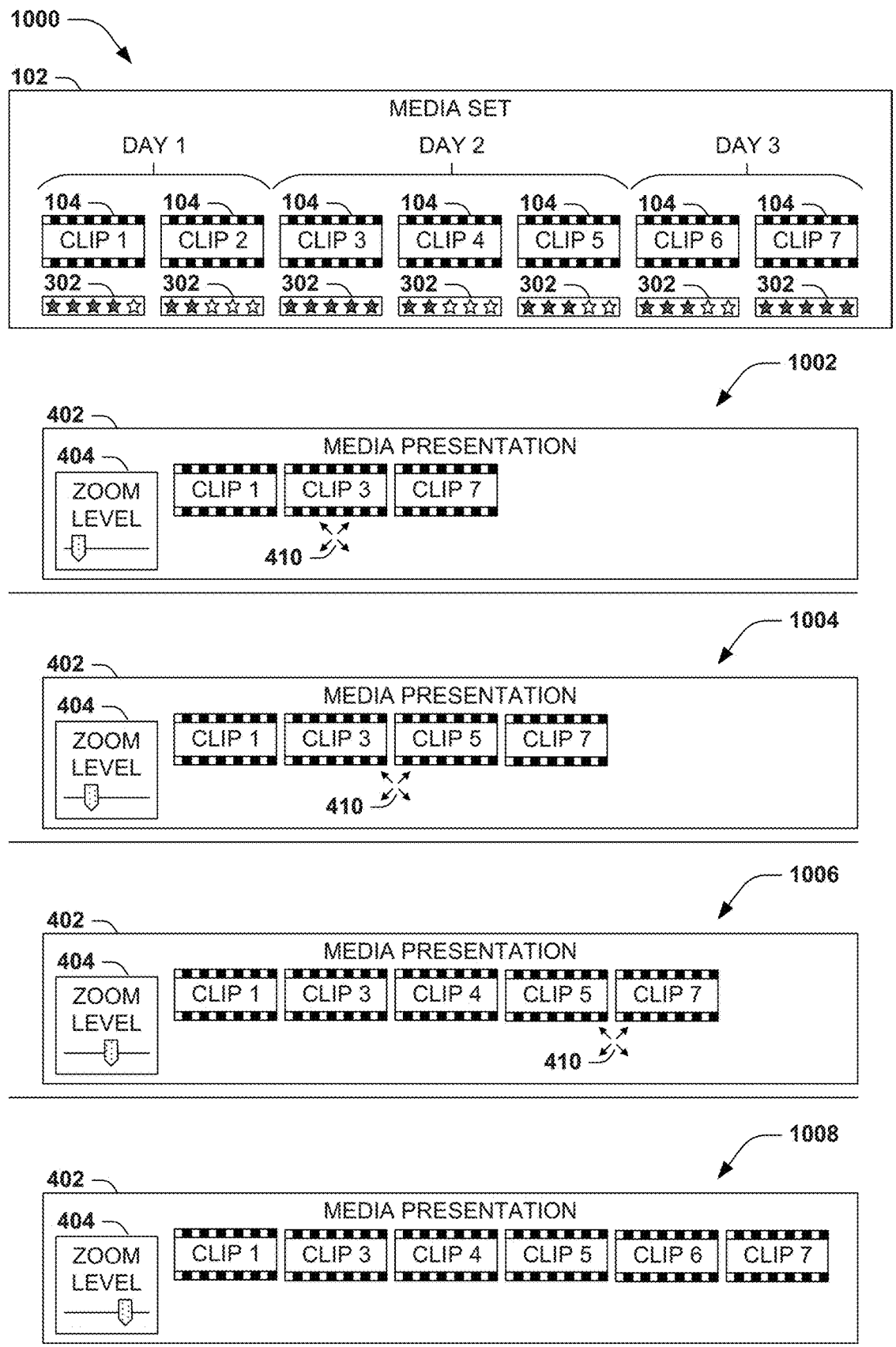
FIG. 10 is an illustration of an exemplary scenario featuring an effect of a zoom operation within a zoomable media presentation of a media set comprising video clips.

FIG. 10 presents a third exemplary scenario 1000 featuring an implementation of a zoomable media presentation 402 of a media set 102 comprising a media stream, such as a video presentation, and some exemplary effects of zoom operations thereupon. In this second exemplary scenario 1000, the media objects 104 representing video clips from various days (e.g., depicting events captured on various days of a multi-day event), each video clip having a rating 302. For example, video clips 1-2 may have been captured on a first day; video clips 3-5 may have been captured on a second day; and video clips 6-7 may have been captured on a third day. In this exemplary scenario 1000, the media set 102 is presented as a concatenation of selected video clips (e.g., depicting a summary of the multi-day event), and the zoom mechanic of the zoomable media presentation 402 is implemented to adjust the amount of detail in a particular section the concatenation through the inclusion or removal of video clips. For example, at a first state 1002, the zoomable media presentation 402 may represent the media set 102 as a concatenation of the representative video clip of each day, e.g., the video clip from each day having the highest rating 302 (video clips 1, 3, and 7). However, a zoom-in operation 410 near the second video clip in this concatenation (video clip 2) results in a second state 1004 that inserts into the concatenation an additional video clip having the highest rating 302 among the video clips from the same day as the zoomed video clip that were not included in the first state 1002. Similarly, at the second state 1004, a further zoom-in operation 410 between the video clips 3 and 5 results in an insertion, between these two video clips, of the video clip having the highest rating 302 among all video clips between video clips 3 and 5 that are not currently inserted (i.e., video clip 4). Finally, at the third state 1006, a further zoom-in operation 410 between the video clips 5 and 7 results in an insertion, between these two video clips, of the video clip having the highest rating 302 among all video clips between video clips 5 and 7 that are not currently inserted (i.e., video clip 6). The zoom-in operations therefore enable the presentation of an extended video summary of the event, and particularly involve the addition of detail from selected portions of the video summary in a realtime manner and without adding detail to other portions of the video summary, Conversely, zoom-out operations 418 may enable the removal of comparatively low-rated video segments, resulting in a more concise video summary of the associated day of the event.

As a third variation of this third aspect, the manner of inserting and/or removing media objects 104 into and from the zoomable media presentation 402 may be achieved unobtrusively, e.g., by promptly inserting the media object 104, such as by promptly extending the video summary in the exemplary scenario 900 of FIG. 9. For example, in a deeply zoomable media presentation 402, a media object 104 having a low rating 302 may be included, but may be scaled to such a small size as to be unrecognizable, indiscernible, or entirely hidden in the initial, low-zoom-level mode of the zoomable media presentation 402 (e.g., at the lowest zoom level 404 of the zoomable media presentation 402, a low-rated media object 104 may be downscaled to one or two pixels that may be easily overlooked, or may even be scaled below one pixel and may therefore not appear on the display of the device). Alternatively, an embodiment of these techniques may include in the zoomable media presentation 402 only media objects 104 that are scaled above a minimum scale threshold, and may omit from the zoomable media presentation 402 any media objects 104 scaled below the minimum scale threshold. Additionally, transitions may be utilized to indicate the addition or removal of media objects 104 as the zoom level 404 of the zoomable media presentation 402 changes. For example, an embodiment may be configured to, upon transitioning to a higher zoom level 404 where a particular media object 104 is scaled above the minimum scale threshold, transition the media object 104 into the zoomable media presentation 402; and/or, upon transitioning to a lower zoom level 404 wherein a media object 104 is scaled below the minimum scale threshold, transition the media object 104 out of the zoomable media presentation 402. Such transitions may, e.g., depict the media object 104 as fading, popping, scaling, or sliding into position within the zoomable media presentation 402.

As a fourth example of this third aspect, where the zoomable media presentation 402 at a particular zoom level 404 hides from view one or more media objects 104 of the media set 102, an embodiment of these techniques may include in the zoomable media presentation 402 a zoom indicator that indicates the availability, visible at a higher zoom level 404, of one or more additional media objects 102. For example, for respective media objects 104 that are associated with at least one hidden media object 104 scaled below the minimum scale threshold, the embodiment may present in the zoomable media presentation 402, near the media object 104, an zoom indicator that the at least one hidden media object. The zoom indicator may be presented as a non-interactive visual indicator of such availability and/or the zoom level 404 at which additional media objects 104 may become visible. Alternatively, the zoom indicator may be presented as an interactive control; e.g., upon detecting an interaction of the user 106 with the zoom indicator, the embodiment may transition the zoomable media presentation 402 to a higher zoom level 44 where at least one hidden media object is scaled above the minimum scale threshold, and therefore presented to the user 16. Moreover, the zoom indicator may indicate the current zoom level 404 of the zoomable media presentation 402, and/or may include a control (e.g., a slider) enabling the user 106 to select a zoom level 404 of the zoomable media presentation 402.

As a fourth variation of this third aspect, the zoomable media presentation 402 may arbitrarily position the media objects 104 within the presentation space of the media set 102 (e.g., within the window, pane, tab, control, or region where the media set 102 is presented). For example, the initially presented media objects 104 maybe spaced equally within the presentation space, and may even float within the presentation space; and when a media object 104 is to be inserted into the zoomable media presentation 402, the location of the inserted media object 104 may be arbitrarily selected (so long as the inserted media object 104 is near the zoomed media object 414). Alternatively, an embodiment of these techniques may select the positions of respective media objects 104 in order to achieve a particular arrangement of the media objects 104. As a first such example, the zoomable media presentation 402 may include a media set context, such as a region, and respective media objects 104 may relate to the media set context (e.g., the geolocations of respective images within the region). The presentation of the zoomable media presentation 402 may therefore include a context depiction of the media set context (e.g., a map of the region), and the positions of the media objects 104 within the presentation space of the zoomable media presentation 402 may be selected with respect to the position of the media object 104 with respect to the media set context.

As a second such example, the media objects 104 of the media set 102 may be ordered according to an ordering criterion selected by the user 106 (e.g., a creation date order, an alphabetic name order, or a rating order). Arranging the media objects 104 within the zoomable media presentation 402 may involve identifying an order of each media object 104 according to the ordering criterion, and positioning the media objects within the presentation space according to the order of each media object 104. For example, the presentation space of the zoomable media presentation 402 may include one or more axes, each representing a different ordered property of the media set 102; and in addition to positioning the media objects 104 of the media set 102 in relation to the associations thereamong, the objects 104 may be positioned along the at least one axis based on the properties of the media objects 104. Those of ordinary skill in the art may devise many aspects of the presentation of the zoomable media presentation 402 in accordance with the techniques presented herein.

Figure 11:
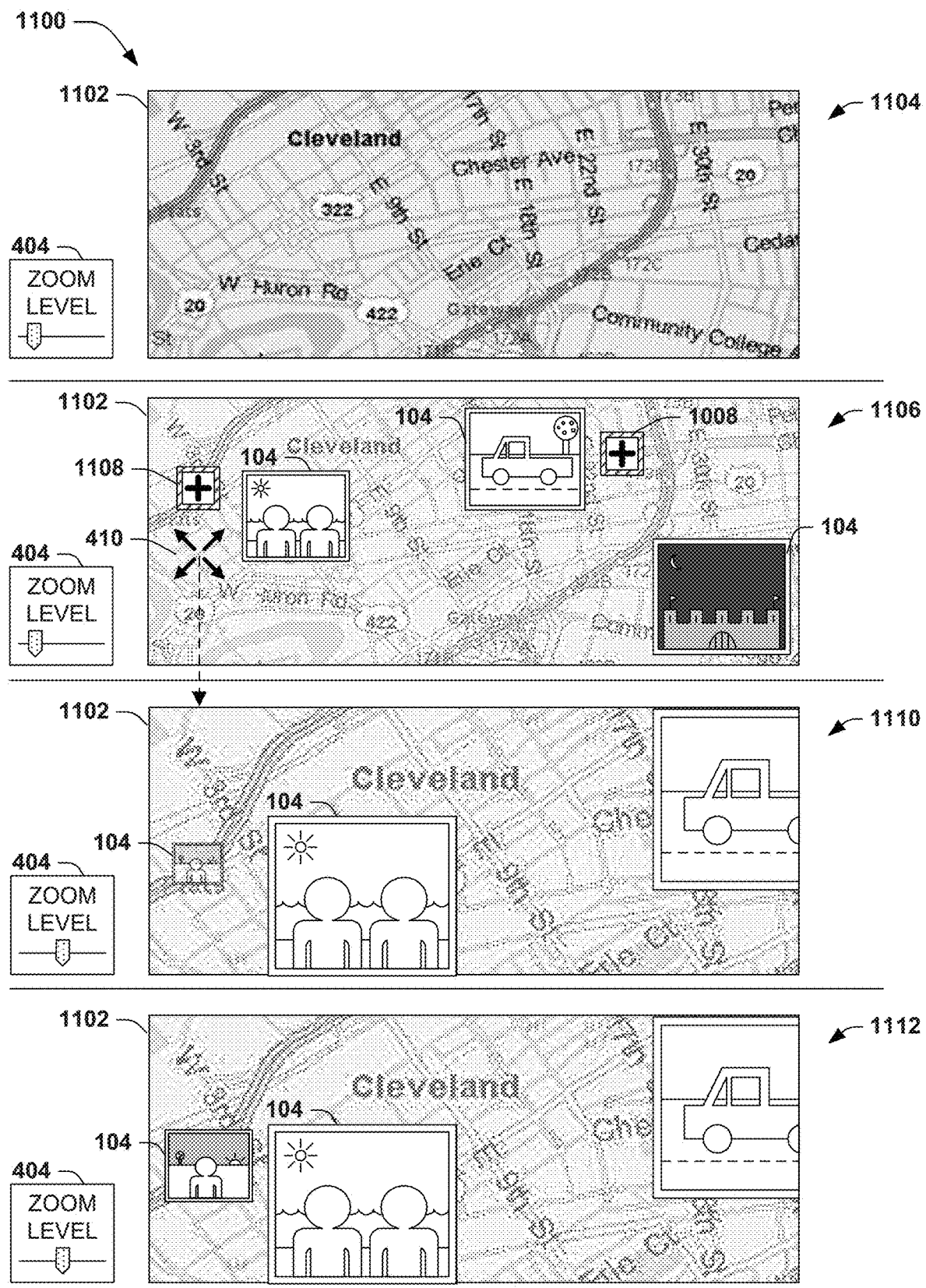
FIG. 11 is an illustration of an exemplary scenario featuring an arrangement of the media objects of a media set using a media set context of the media set.

FIG. 11 presents an illustration of an exemplary scenario 1100 featuring some features relating to the zoomable media presentation 402. In this exemplary scenario 1100, the zoomable media presentation 402 includes a media set context, such as a region wherein the images comprising the media set 102 are captured. Accordingly, at a first state 1104, the zoomable media presentation 402 may present a depiction 1102 of the media set context, such as a map of the region. At a second state 1106 (e.g., an initial state), the zoomable media presentation 402 may present only the three media objects 104 having high ratings 302 within the media set 102; and an embodiment of these techniques may arrange these media objects 104 on the depiction 1102 according to the geocoordinates of the images within the region. Respective media objects 104 are also scaled according to the zoom level 404 of the zoomable media presentation 402 and the ratings 302 of the media object 104. Moreover, at the second state 1106, a fourth media object 104 may be hidden from view (due to a lower rating of the fourth media object 104 and the currently low zoom level 404 of the zoomable media presentation 402), and a zoom indicator 1108 may be presented to indicate the availability of the fourth media object 104 at a higher zoom level 404. When a user 106 selects the zoom indicator 1108, the embodiment may transition the zoomable media presentation 402 to the higher zoom level 404 wherein the fourth media object 104 is visible. Moreover, upon reaching the higher zoom level 404 where the fourth media object 104 is viewable (e.g., where the scaling of the fourth media object 104 exceeds a minimum scale threshold), the embodiment may transition the fourth media object 104 into the zoomable media presentation 402. For example, at a third zoom state 1110, the newly inserted fourth media object 104 appears small and semi-transparent, but shortly thereafter (e.g., at a fourth state 1112), the newly inserted fourth media object 104 appears full-size and non-transparent. In this manner, the exemplary scenario 1100 of FIG. 11 presents several of the variations described herein of this third aspect.

Figure 12:
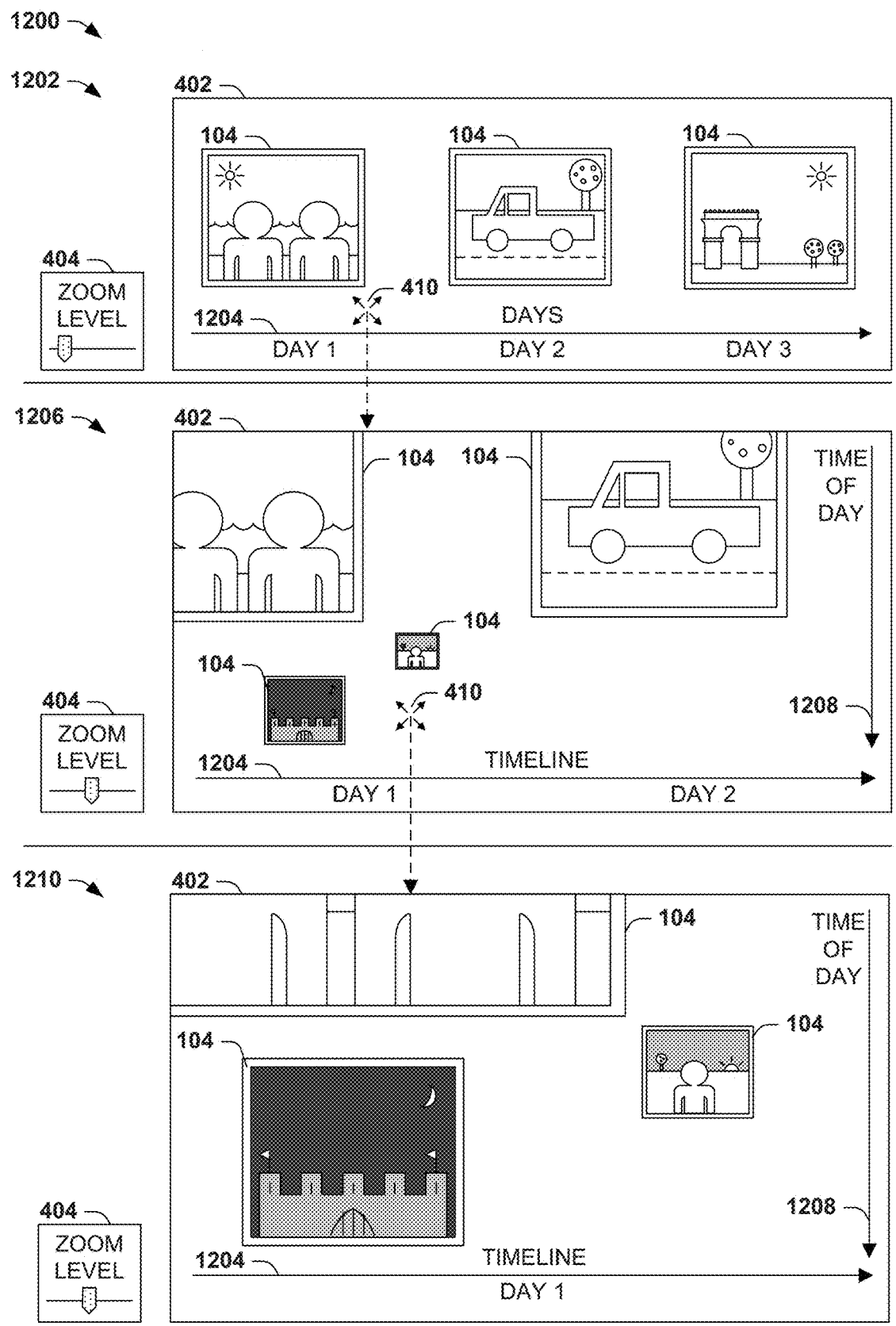
FIG. 12 is an illustration of an exemplary scenario featuring an arrangement of the media objects of a media set using two axes representing different properties of the media objects.

FIG. 12 presents an illustration of another exemplary scenario 1200 featuring the arrangement of media objects 104 within the zoomable media presentation 402 according to various properties of the media objects 104. In this exemplary scenario 1200, the media set 102 includes media objects 104 respectively associated with a day over a period, and the zoomable media presentation 402 includes a first axis 1204 the days of the period. The zoomable media presentation 402 therefore arranges respective media objects 104 along the first axis 1204 according to the day of the media object 104. At a first state 1202, if a zoom-in operation 410 near a zoomed media object 414 is detected, then a second state 1206 of the zoomable media presentation 402 may insert, near the zoomed media object 414, two additional media objects 104 that are associated with the zoomed media object 414 and that have lower ratings than the zoomed media object 414. Moreover, at the second state 1206, the zoomable media presentation 414 may present a second axis 1208 representing the time of day depicted by the media object 104; e.g., images captured earlier in the day are positioned higher than images captured later in the day. This positioning may be maintained through further zoom operations; e.g., a zoom-in operation 410 detected at the second state 1206 may result in a third state 1210 wherein the media objects 104 are correspondingly scaled, but remain positioned with respect to the first axis 1204 and the second axis 1208. In this manner, the media objects 104 of the media set 102 may be arranged within the presentation space in addition to representing the "drill-down" aspects of the zoomable media presentation 414 according to the techniques presented herein.

As a fifth variation of this third aspect, the presentation of the media set 102 may be differently adjusted for different users 106. As a first such example, for a particular media set 102, a first user 106 may assign a first set of ratings 302 to respective media objects 104 of the media set 102, and an embodiment of these techniques may present the media set 102 as a first zoomable media presentation 402 using the first set of ratings 302. However, a second user 106 may assign a second, different set of ratings 302 to respective media objects 104 of the media set 102, and an embodiment of these techniques may present the media set 102 as a second zoomable media presentation 402 using the second set of ratings 302 (e.g., through explicit assignment of ratings 302, through interactions with the media objects 104 of the media set 102 from which ratings 302 may be inferred, or through the identification of subjects associated with respective media objects 104 and the relative interest of the user 106 in the depicted subjects). Moreover, the sets of ratings 302 assigned by different users 106 may be persisted (e.g., as part of a user profile of respective users 106 stored by a service presenting the media set 102 to the users 106, or as a cookie on the devices of respective users 106), such that when a user 106 revisits the media set 102, the ratings 302 previously assigned by the user 106 may be utilized to generate the zoomable media presentation 402. As a second such example, ratings 302 of the media objects 104 assigned by a first user 106 (including a set of users) may be used to present the media objects 104 to a second user 106 (e.g., a presentation of media objects 104 in the media set 102 that other users 106 have identified as popular, or a presentation of media objects 104 rated by a first user 106 on behalf of a second user 106). As a third such example, a second user 106 may alter a zoomable media presentation 402 generated by a first user 106 (e.g., an initial set of ratings 302 assigned by a first user 106, and reassigned by the second user 106) to generate a zoomable media presentation 402 of the media set 102 that is customized by and for the second user 106. Those of ordinary skill in the art may devise many ways of allowing multiple users to generate and customize zoomable media presentations 402 that may be compatible with the techniques presented herein.

E. Computing Environment

Figure 13:
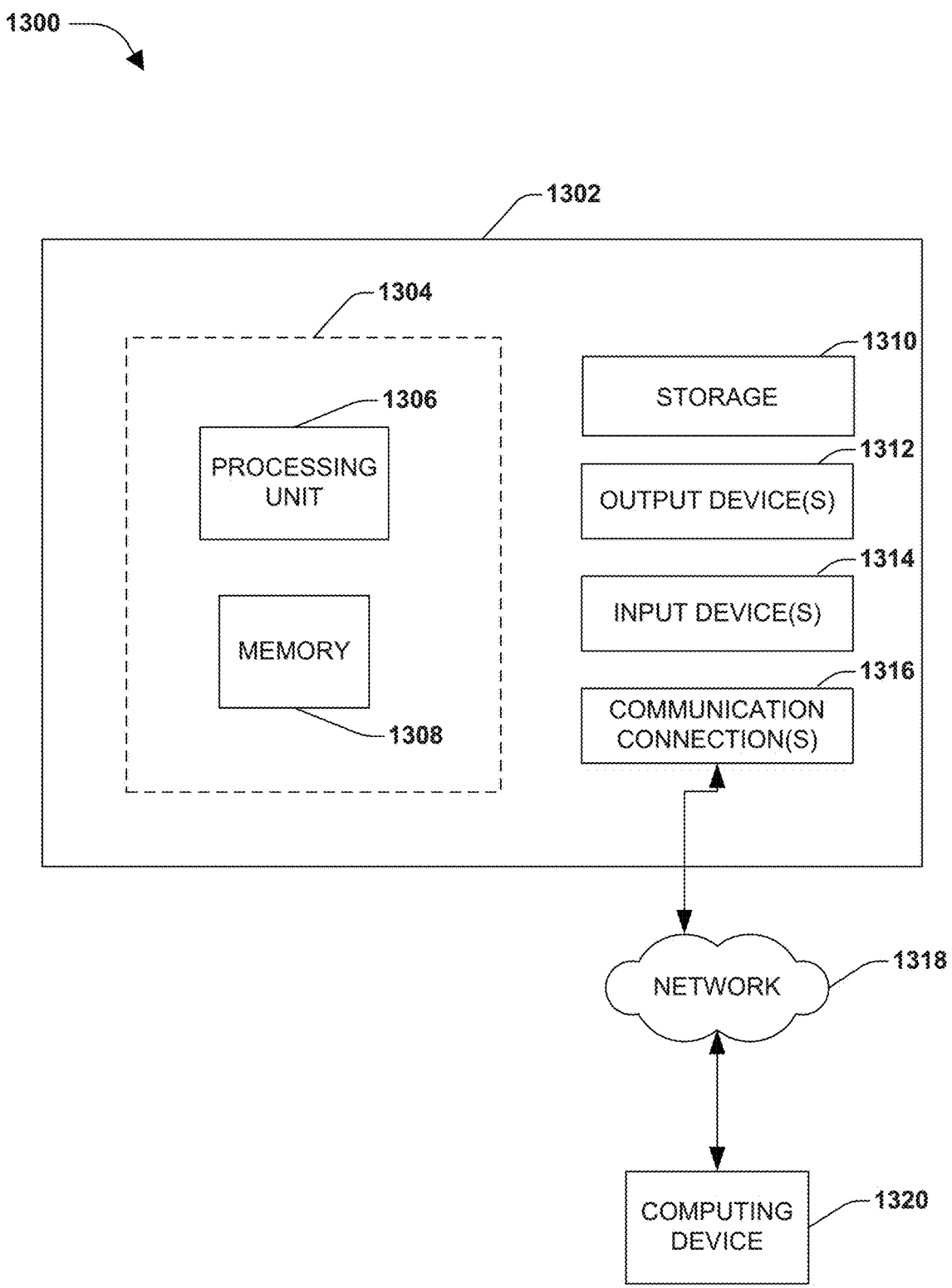
FIG. 13 illustrates an exemplary computing environment wherein one or more of the provisions set forth herein may be implemented.

FIG. 13 presents an illustration of an exemplary computing environment within a computing device 1302 wherein the techniques presented herein may be implemented. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, and distributed computing environments that include any of the above systems or devices.

FIG. 13 illustrates an example of a system 1300 comprising a computing device 1302 configured to implement one or more embodiments provided herein. In one configuration, the computing device 1302 includes at least one processor 1306 and at least one memory component 1308. Depending on the exact configuration and type of computing device, the memory component 1308 may be volatile (such as RAM, for example), non-volatile (such as ROM, flash memory, etc., for example) or an intermediate or hybrid type of memory component. This configuration is illustrated in FIG. 13 by dashed line 1304.

In some embodiments, device 1302 may include additional features and/or functionality. For example, device 1302 may include one or more additional storage components 1310, including, but not limited to, a hard disk drive, a solid-state storage device, and/or other removable or non-removable magnetic or optical media. In one embodiment, computer-readable and processor-executable instructions implementing one or more embodiments provided herein are stored in the storage component 1310. The storage component 1310 may also store other data objects, such as components of an operating system, executable binaries comprising one or more applications, programming libraries (e.g., application programming interfaces (APIs), media objects, and documentation. The computer-readable instructions may be loaded in the memory component 1308 for execution by the processor 1306.

The computing device 1302 may also include one or more communication components 1316 that allows the computing device 1302 to communicate with other devices. The one or more communication components 1316 may comprise (e.g.) a modem, a Network Interface Card (NIC), a radiofrequency transmitter/receiver, an infrared port, and a universal serial bus (USB) USB connection. Such communication components 1316 may comprise a wired connection (connecting to a network through a physical cord, cable, or wire) or a wireless connection (communicating wirelessly with a networking device, such as through visible light, infrared, or one or more radiofrequencies.

The computing device 1302 may include one or more input components 1314, such as keyboard, mouse, pen, voice input device, touch input device, infrared cameras, or video input devices, and/or one or more output components 1312, such as one or more displays, speakers, and printers. The input components 1314 and/or output components 1312 may be connected to the computing device 1302 via a wired connection, a wireless connection, or any combination thereof. In one embodiment, an input component 1314 or an output component 1312 from another computing device may be used as input components 1314 and/or output components 1312 for the computing device 1302.

The components of the computing device 1302 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of the computing device 1302 may be interconnected by a network. For example, the memory component 1308 may be comprised of multiple physical memory units located in different physical locations interconnected by a network.

Those skilled in the art will realize that storage devices utilized to store computer readable instructions may be distributed across a network. For example, a computing device 1320 accessible via a network 1318 may store computer readable instructions to implement one or more embodiments provided herein. The computing device 1302 may access the computing device 1320 and download a part or all of the computer readable instructions for execution. Alternatively, the computing device 1302 may download pieces of the computer readable instructions, as needed, or some instructions may be executed at the computing device 1302 and some at computing device 1320.

F. Usage of Terms

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting a media set comprising a plurality of media objects on a device having a processor, the method comprising:
identifying ratings of media objects within the media set, wherein the ratings are based on user input;
upon receiving a request to present a media presentation, presenting a zoomable media presentation at a low zoom level comprising only media objects having high ratings; and
upon receiving a request to zoom-in into the zoomable media presentation near a zoomed media object:
decreasing a size of the zoomed media object to provide additional visual space; and
inserting near the zoomed media object media objects that are associated with the zoomed media object and have lower ratings than the zoomed media object, wherein at least some of the inserted media objects are presented within the additional visual space; and
presenting the media objects using different zoom levels according to the ratings of the media objects such that lower rated media objects are smaller than higher rated media objects.

2. The method of claim 1, wherein:
the media set comprises a media stream;
respective media objects comprise a media segment within the media stream; and
inserting the media object associated with the zoomed media object comprises:
inserting near the zoomed media object the media segment having a lower rating than the zoomed media object.

3. The computing device of claim 1, wherein the execution of additional instructions stored on the memory device further causes the processor to:
monitor interactions with a first media object; and
select a first rating for the first media object according to the monitored interactions.

4. A method of generating a media presentation of a media set comprising a plurality of media objects on a device having a processor, the method comprising:
identifying ratings of media objects within the media set, wherein the ratings are based on an aspect of user consumption of the media object;
presenting a zoomable media presentation at a low zoom level comprising only media objects having high ratings; and
upon zooming-in near a zoomed media object:
decreasing a size of the zoomed media object to provide additional visual space;
presenting near the zoomed media object the media objects that are associated with the zoomed media object and have lower ratings than the zoomed media object, wherein at least some of the inserted media objects are presented within the additional visual space; and
scaling the presented media objects to different zoom levels according to the ratings of the media objects such that lower rated media objects are smaller than higher rated media objects.

5. The method of claim 4, wherein at least one media object comprises a media subset of the media set.

6. The method of claim 4, wherein the identifying the ratings comprises:
presenting a first media object to a user;
monitoring interactions of the user with the first media object; and
selecting a rating of the first media object according to the monitored interactions of the user with the first media object.

7. The method of claim 4, wherein
the identifying the ratings comprises:
for a first media object groups:
selecting a high rating for a representative media object; and
selecting a lower rating for other media objects of the first media object group than for the representative media object.

8. The method of claim 4, wherein the identifying the ratings comprises:
selecting the rating of a first media object according to a media object quality of the first media object.

9. The method of claim 8, wherein the first media object is associated with a first subject; and
wherein the selecting the rating of the first media object comprises:
selecting the rating of the first media object according to the significance of the first subject.

10. The method of claim 8, wherein
selecting the rating of the first media object comprises:
selecting the rating of the first media object according to a hierarchical position of the first media object.

11. The method of claim 4, wherein the presenting the zoomable media presentation at the low zoom level comprises presenting only media objects that are scaled above a minimum scale threshold.

12. The method of claim 11, wherein the presenting the zoomable media presentation further comprises:
upon transitioning to a higher zoom level wherein a first media object is scaled above the minimum scale threshold, presenting the first media object in the zoomable media presentation; and
upon transitioning to a lower zoom level wherein the first media object is scaled below the minimum scale threshold, no longer presenting the first media object in the zoomable media presentation.

13. The method of claim 11, wherein:
the presenting the zoomable media presentation further comprises:
presenting near a first media object a zoom indicator indicating that a second media object associated with the first media object is scaled below the minimum scale threshold.

14. The method of claim 13, wherein the zooming-in is triggered by interaction with the zoom indicator.

15. The method of claim 4, wherein:
the presenting the zoomable media presentation comprises
arranging the media objects within a presentation space.

16. The method of claim 15, wherein the presenting the zoomable media presentation comprises:
receiving an ordering criterion;
for respective media objects, identifying an order of the media object according to the ordering criterion; and
arranging the media objects within the presentation space by positioning respective media objects within the presentation space according to the order of the media object.

17. The method of claim 15 wherein
the arranging the media objects within the presentation space comprises:
positioning a first media object according to a position of the first media object within a media set context.

18. A computing device comprising:
a memory device configured to store instructions for generating a media presentation of a media set comprising a plurality of media objects; and
a processor operatively coupled to the memory device, wherein execution of the instructions for generating the media presentation causes the processor to:
identify ratings of media objects within the media set, wherein the ratings are based on sharing of the media objects by a user;
present a zoomable media presentation at a low zoom level comprising only media objects having high ratings; and
upon zooming-in near a zoomed media object:
decrease a size of the zoomed media object to provide additional visual space;
present near the zoomed media object the media objects that are associated with the zoomed media object and have lower ratings than the zoomed media object wherein at least some of the inserted media objects are presented within the additional visual space; and
scale the presented media objects to different zoom levels according to the ratings of the media objects such that lower rated media objects are smaller than higher rated media objects.

19. The computing device of claim 18, wherein the presenting the zoomable media presentation at the low zoom level comprises presenting only media objects that are scaled above a minimum scale threshold.

* * * * *